United States Patent
Wu et al.

(10) Patent No.: US 7,839,045 B2
(45) Date of Patent: Nov. 23, 2010

(54) PERMANENT MAGNET ROTARY STRUCTURE OF ELECTRIC MACHINE

(75) Inventors: Lijian Wu, Shanghai (CN); Wanbing Jin, Shanghai (CN); Jianping Ying, Shanghai (CN); Shih-Ming Huang, Shanghai (CN); Wen-Shi Huang, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/827,934

(22) Filed: Jul. 13, 2007

(65) Prior Publication Data

US 2008/0157619 A1 Jul. 3, 2008

(30) Foreign Application Priority Data

Dec. 28, 2006 (TW) .............................. 95149605 A

(51) Int. Cl.
H02K 21/12 (2006.01)
(52) U.S. Cl. ............... 310/156.48; 310/51; 310/156.38; 310/269
(58) Field of Classification Search ............ 310/51, 310/156.38, 156.48, 269, 156, 154; H02K 21/22, H02K 29/00, 21/12, 21/26, 21/38, 23/04
See application file for complete search history.

(56) References Cited

U.S. PATENT DOCUMENTS 5,345,133 A * 9/1994 Satake ..................... 310/266
5,682,072 A * 10/1997 Takahashi .............. 310/156.46
6,081,058 A * 6/2000 Suzuki et al. .......... 310/156.45
6,181,035 B1 * 1/2001 Acquaviva .................... 310/51
6,242,837 B1 * 6/2001 Matsunobu et al. ... 310/216.001
6,727,630 B1 * 4/2004 Maslov et al. ............ 310/254.1
6,784,582 B1 * 8/2004 Kolomeitsev et al. .. 310/156.38
6,940,198 B2 * 9/2005 Ionel et al. ............. 310/156.47
2002/0033648 A1 * 3/2002 Harada et al. .......... 310/156.38
2002/0074886 A1 * 6/2002 Harada et al. .......... 310/154.23
2006/0055266 A1 * 3/2006 Iwami et al. ........... 310/156.47
2008/0157619 A1 * 7/2008 Wu et al. ................ 310/156.48

FOREIGN PATENT DOCUMENTS

JP 03056060 A * 3/1991
JP 7135758 5/1995
JP 07135758 A * 5/1995

OTHER PUBLICATIONS

JP 07-135758_EN.pdf :.Arita (JP 07135758, IDS), English translation, 1995.*
Miller_BLDC_ch3.pdf : Design of Brushless Permanent Magnet Motors, written by Prof. Miller, 1994.*

* cited by examiner

*Primary Examiner*—Quyen Leung
*Assistant Examiner*—John K Kim
(74) *Attorney, Agent, or Firm*—Volpe and Koenig, PC

(57) ABSTRACT

A permanent magnet motor is provided. The permanent magnet motor includes a stator having a stator shaft having an outer surface, K salient teeth formed upon the outer surface, and K winding slots formed among the K salient teeth, and a rotor having a first inner surface facing the outer surface, and P pairs of permanent magnets formed on the first inner surface, each of which has a second inner surface facing the outer surface and at least a groove formed on the second inner surface to reduce a cogging torque.

14 Claims, 23 Drawing Sheets

PERMANENT MAGNET ROTARY STRUCTURE OF ELECTRIC MACHINE

FIELD OF THE INVENTION

The present invention relates to a rotary structure of a permanent magnet motor, in particular, to a rotary structure applied in a brushless motor permanent magnet motor so as to reduce the cogging torque.

BACKGROUND OF THE INVENTION

There are several advantages as follows that the permanent magnet motor possesses such as: the simplified structure, the reliable motion, the small volume, the light weight, the lower losses and the highly efficiency etc. Furthermore, the shape and the size of the motor are easily variable such that it is wildly applicable to the field of the aviation industry, the national defense, the industry, the agriculture and the respective field in the daily life.

Please referring to FIG. 1, which is a cross-sectional view illustrating the rotary structure of a conventional outer rotor permanent magnet motor, in which a permanent magnet motor with eight poles and six slots is presented as an example for addressing the rotary structure 801 of a permanent magnet motor. The rotary structure 801 of a permanent magnet motor includes a stator 30 and a rotor 40, in which the cylindrical stator 30 is fixed inside the inner space of permanent magnet motor in order to produce a rotating magnetic field, the stator 30 with the rotating magnetic field is encircled by the rotor 40 that is in circular shape and is coaxial with the stator 30. The magnetic field of the rotor 40 interacts with the rotating magnetic field provided by the stator 30 to cause the rotor 40 rotating.

The stator 30 of the rotary structure 801 includes a stator core 1, a stator shaft 2 and six windings 3, in which the stator core 1 is fixed to the stator shaft 2 and includes the magnetic materials, six windings 3 are winded on the six salient teeth 5, and the driving current flows through the six windings 3 in order to produce the rotating magnetic field of the stator 30.

The rotor 40 of the rotary structure 801 includes a rotor yoke 7 and eight permanent magnets 8, in which the rotor yoke 7 is in circular shape and the eight permanent magnets 8 are uniformly distributed in a round shape along the inner surface of the rotor yoke 7. The N pole and the S pole of the eight permanent magnets 8 are alternatively exchanged and each of the eight permanent magnets 8 is a magnetic pole including the magnetic material. The rotor 40 rotates around the stator shaft 2 of the stator 30 and an air gap is formed among the outer surface of the salient teeth 5 of the stator 30, the winding slot openings 6 and the permanent magnets 8 of the rotor 40.

In FIG. 1, sufficient electric current is injected into the windings 3 for driving the rotor 40 rotating in accordance with the demands. A cogging torque is produced since the winding slots 4 formed by the permanent magnets 8 and the stator 30 interacts with the winding slot openings 6. The cogging torque refers to the torque variations induced by the interaction between the distribution of the magnetomotive force and the distribution of the air gap permeance for the existence of the slots of the stator. Therefore, in accordance with the preceding definition, the corresponding torque produced by the rotation of the rotor while no driving current exists in the windings is the cogging torque.

The issues raised by the cogging torque are the variation of the output torque of the electric machine such that the smooth operation of the electric machine is influenced, and the speed of the motor becomes unstable and the noise and vibration are thus generated.

Please refer to FIG. 2, which is a cross-sectional view illustrating the rotary structure of a second kind of a conventional outer rotor permanent magnet motor. In FIG. 2, a permanent magnet motor with ten poles and twelve slots is presented as an example for addressing the rotary structure 802. As compared with FIG. 1, both figures share the same reference numerals for addressing the identical element. The only difference between these two figures is the total number of poles and slots.

Please refer to FIG. 3, which is a cross-sectional view illustrating the rotary structure of a third kind of a conventional outer rotor permanent magnet motor. In FIG. 3, an arc-cut permanent magnet motor with eight poles and six slots is presented as an example for addressing the rotary structure 803. As compared with FIG. 1, the present preferred embodiment is based on the embodiment disclosed in FIG. 1 and further includes a pair of arc-cut surfaces formed at two sides of each permanent magnet 8 so as to reduce the cogging torque. The present preferred embodiment shares the same reference numerals with those of FIG. 1 for addressing the identical element and what is different is that a pair of arc-cut surfaces 11 is formed at two sides of each permanent magnet 8. The pair of arc-cut surfaces 11 are symmetrically distributed to each other along the radial direction of each permanent magnet 8 and the thickness at the terminal side of each permanent magnet 8 gradually becomes thinner along the circumference direction.

Please refer to FIG. 4, which is a cross-sectional view illustrating the rotary structure of a fourth kind of a conventional outer rotor permanent magnet motor. In FIG. 4, an arc-cut permanent magnet motor with ten poles and twelve slots is presented as an example for addressing the rotary structure 804. As compared with FIG. 3, both figures share the same reference numerals for addressing the identical element and the only difference between these two figures is the total number of poles and slots.

Please refer to FIG. 5, which is a cross-sectional view illustrating the rotary structure of a fifth kind of a conventional outer rotor permanent magnet motor. In FIG. 5, an arc-cut permanent magnet motor with ten poles and twelve slots is presented as an example for addressing the rotary structure 805. As compared with FIG. 4, the difference between these two figures is that the corresponding angular range of the arc-cut surface 11 in the present preferred embodiment is smaller than that illustrating in FIG. 4. The present preferred embodiment shares the same reference numerals with those of FIG. 4 for addressing the identical element.

Subsequently, a permanent magnet motor with eight pole and six slots is presented as an example for addressing the rotary structure of a conventional permanent magnet motor. The rotary structure of the inner rotor permanent magnet motor includes a stator and a rotor, in which the circular stator is fixed so as to form an external structure of the permanent magnet motor and to produce a rotating magnetic field. The cylindrical rotor having a rotor magnetic field is encircled by the stator and is coaxial with the stator. The magnetic field of the rotor interacts with the rotating magnetic field provided by the stator 30 whereby the rotor 40 is thus driven to rotate.

The stator of the inner rotor permanent magnet motor includes a stator ring and six windings, in which the stator ring is in circular shape, symmetric to a central axis and includes the magnetic material. The stator ring includes an outer stator yoke and six salient teeth. The six salient teeth are extended from the stator yoke to the rotor shaft and are uniformly distributed corresponding to the rotor shaft. Six winding slots and six winding slot openings are formed by the six salient teeth, and six windings 3 are winded on the six salient teeth 5. The driving current flows through the six windings 3 such that the rotating magnetic field of the stator is produced accordingly.

The rotor of the inner rotor permanent magnet motor includes a stator core and eight permanent magnets, in which the stator core is in circular shape and the eight permanent magnets 8 are uniformly distributed at the surface of the rotor core corresponding to the rotor shaft. The N pole and the S pole of the eight permanent magnets 8 are alternatively exchanged. Each of the eight permanent magnets 8 is a magnetic pole including the magnetic material. The rotor rotates with the rotor shaft and an air gap is formed among the inner surface of the salient teeth of the stator, the winding slot openings and the permanent magnets of the rotor.

Although the rotary structure of a conventional outer rotor permanent magnet motor introduced in the preceding FIG. 3, FIG. 4 and FIG. 5 and the rotary structure of a conventional inner rotor permanent magnet motor corresponding to what is introduced in the preceding FIG. 3, FIG. 4 and FIG. 5 possess the efficiency of reducing the cogging torque, however, the efficiency thereof is still unable to meet the requirements. Hence, improving the preceding drawbacks existing in the conventional technique is one of the critical motivations to inspire this invention.

To overcome the mentioned drawbacks of the prior art, a novel permanent magnet rotary structure of electric machine is provided.

SUMMARY OF THE INVENTION

It is therefore an object of the present invention to propose a permanent magnet motor and a controlling method thereof reducing a cogging torque of the motor.

According to the first aspect of the present invention, a permanent magnet motor includes a stator including a stator shaft having an outer surface, K salient teeth formed upon the outer surface, and K winding slots formed among the K salient teeth, and a rotor including a first inner surface facing the outer surface, and P pairs of permanent magnets formed on the first inner surface, each of which has a second inner surface facing the outer surface, at least a groove formed on the second inner surface and a pair of symmetric arc-cut surfaces formed at two sides of each permanent magnet to reduce a cogging torque.

Preferably, the stator further comprises a stator core fixed to the stator shaft, and the K salient teeth are extended from the stator core and are uniformly distributed along the outer surface and symmetric to the stator shaft.

Preferably, the stator further comprises a stator core fixed to the stator shaft, and the K salient teeth are extended from the stator core and are uniformly distributed along the outer surface and symmetric to the stator shaft.

Preferably, the rotor further comprises a rotor yoke, and the P pairs of permanent magnets are fixed to the rotor yoke and are uniformly distributed along the first inner surface and symmetric to the stator shaft.

Preferably, K is a natural number larger than 1, P is a natural number, a respective groove on the second inner surface has a specific angular position chosen from n angular positions, $180 \, \text{Mod}((2P/K)i-P/f,1)$, in which $i=1, 2, \ldots, n$, and the groove has a width of $w_{ps}$, $0.2D \leq w_{ps} \leq 1.1D$, in which $n=M/(2P)$, M is a lowest common multiple of 2P and K, Mod( ) is a remainder operator, f is a wave-cyclic number of the cogging torque per rotation in the absence of the groove, and $D=180 \, \text{Mod}(2P/K,1)$.

Preferably, the groove further comprises an optimized depth value being a highest depth value, while a predetermined structural strength of the motor is maintained, and a waveform and a value of a counter electromotive force of the motor are both kept unchanged so as to reduce the cogging torque.

Preferably, the groove is in an arc cross section.

Preferably, the groove is in a polygonal cross section.

Preferably, the arc-cut surface occupies a peripheral angle $\alpha_p$, on the second inner surface, chosen within a range of: $\alpha_{min}-0.8\alpha_{ss} \leq \alpha_p \leq \alpha_{min}+0.8\alpha_{ss}$, in which $\alpha_{min}=180 \times \min(\text{Mod}((2P/K)i,1))$, $i=1, 2, \ldots, n-1$), $\alpha_{ss}$ is an electrical angle corresponding to a width of one of the K winding slots, and min( ) is a minimum value operator.

Preferably, a groove on the second inner surface has a specific angular position chosen from n angular positions: $180 \times \text{Mod}((2P/K)i-P/f+\beta_0 P/(180f),1)$, where $i=1, 2, \ldots, n$, and $\beta_0$ is the phase difference between the cogging torque wave without the arc-cut surfaces and the cogging torque wave with the arc-cut surfaces.

Preferably, the arc-cut surfaces are symmetric to each other along a radial direction of the stator shaft, and an air gap is formed among the K salient teeth, the K winding slots and the P pairs of permanent magnets.

Preferably, the permanent magnet motor is a rotary electric machine, and the rotor rotates around the stator.

According to the second aspect of the present invention, A permanent magnet motor includes a stator including an inner surface, K salient teeth formed on the inner surface, and K winding slots formed among the K salient teeth, and a rotor including a rotor shaft having a first outer surface facing the inner surface, and P pairs of permanent magnets formed upon the first outer surface, each of which has a second outer surface facing the inner surface, at least a groove formed on the second outer surface and a pair of symmetric arc-cut surfaces formed at two sides of each permanent magnet to reduce a cogging torque.

Preferably, the stator further comprises a stator yoke, and the K salient teeth are extended from the stator yoke.

Preferably, the rotor further includes a rotor core fixed to the rotor shaft, and the P pairs of permanent magnets are symmetric to the rotor shaft and formed on the rotor core.

Preferably, the arc-cut surfaces are symmetric to each other along a radial direction of the rotor shaft.

Preferably, the permanent magnet motor is a rotary electric machine, and the rotor rotates with the rotor shaft.

The foregoing and other features and advantages of the present invention will be more clearly understood through the following descriptions with reference to the drawings:

DETAILED DESCRIPTION OF THE PREFERRED EMBODIMENT

The present invention will now be described more specifically with reference to the following embodiments. It is to be noted that the following descriptions of preferred embodiments of this invention are presented herein for the aspect of illustration and description only, it is not intended to be exhaustive or to be limited to the precise form disclosed.

In order to further demonstrate the rotary structure and the method decreasing the cogging torque of the permanent magnet machine presented by the present application, several preferred embodiments are provided in the following.

Figure 1:
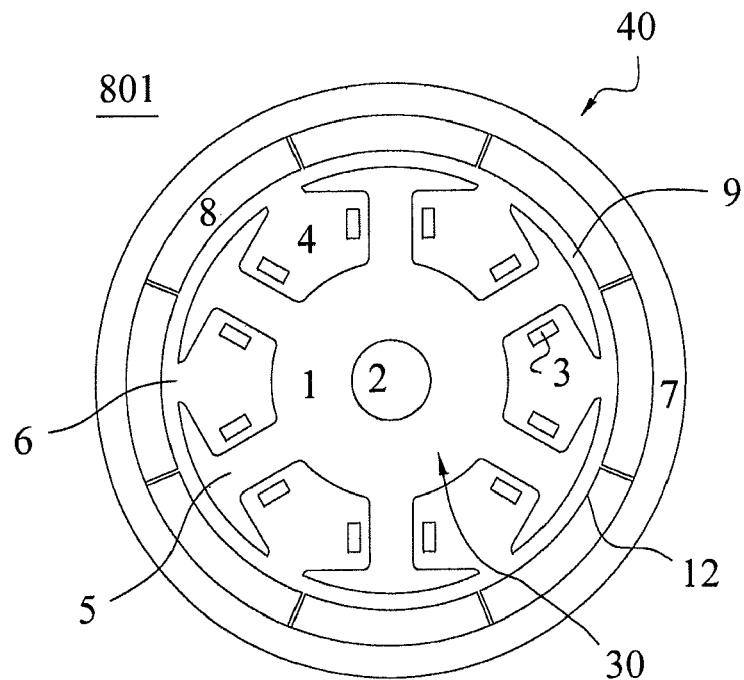
FIG. 1 is a cross-sectional view illustrating the rotary structure of a conventional outer rotor permanent magnet motor.

For the sake of better utilizing the symbol so as to explain the related cogging torque problem, the symbols appearing in the following are already combined with the rotary structure of the permanent magnet motor. The rotary structure of the permanent magnet motor includes a stator 30 and a rotor 40, in which K salient teeth 5 are uniformly distributed on the surface of the stator 30 and K winding slots are formed among the K salient teeth 5, in which K is a natural number larger than 1. P pairs of permanent magnets 8 are uniformly distributed on the surface of rotor 40 and P is a natural number, in which the surface of the stator 30 is divided from the surface of the rotor 40 by an air gap 9. It is defined that M is a lowest common multiple of 2P and K. When the rotor 40 rotates around the stator 30, the cogging torque occurs therefrom. It is defined that f is a wave-cyclic number of the cogging torque per rotation in the absence of the groove. Usually, f is equal to M, the lowest common multiple of 2P and K. In FIG. 1, P=4, K=6, M=24 and the wave-cyclic number of the cogging torque f=24.

In order to reduce the cogging torque of the permanent magnet motor, the scheme is presented as follows. Grooves with adequate size are disposed at the proper location on the arc surface of the permanent magnet, in accordance with the ratio of the total number of the poles and the total number of the slots, 2P/K, and the ratio of half of the total number of the poles and the wave-cyclic number, P/f. And the cogging torque is thus decreased dramatically.

Based on the preceding principle, the method reducing the cogging torque of the permanent magnet motor includes following steps:

(a) determining the wave-cyclic number of the cogging torque under the status that there is not any groove on the arc-cut surfaces of permanent magnets.

(b) calculating the angular position of the n electrical angular positions:

180 Mod((2P/K)i−P/f,1), i=1, 2, . . . , n, where n=M/(2P), M is a lowest common multiple of 2P and K, Mod( ) is a remainder operator, and f is a wave-cyclic number of the cogging torque per rotation in the absence of the groove on the arc surface of the permanent magnet. And the angle is formed by two lines connecting the two boundaries of two neighboring permanent magnets and intersecting at the center of the stator 30.

(c) choosing at least one specific angular position from n angular positions and a groove 10 is disposed at each chosen angular position on the arc surface of the permanent magnet.

Figure 18:
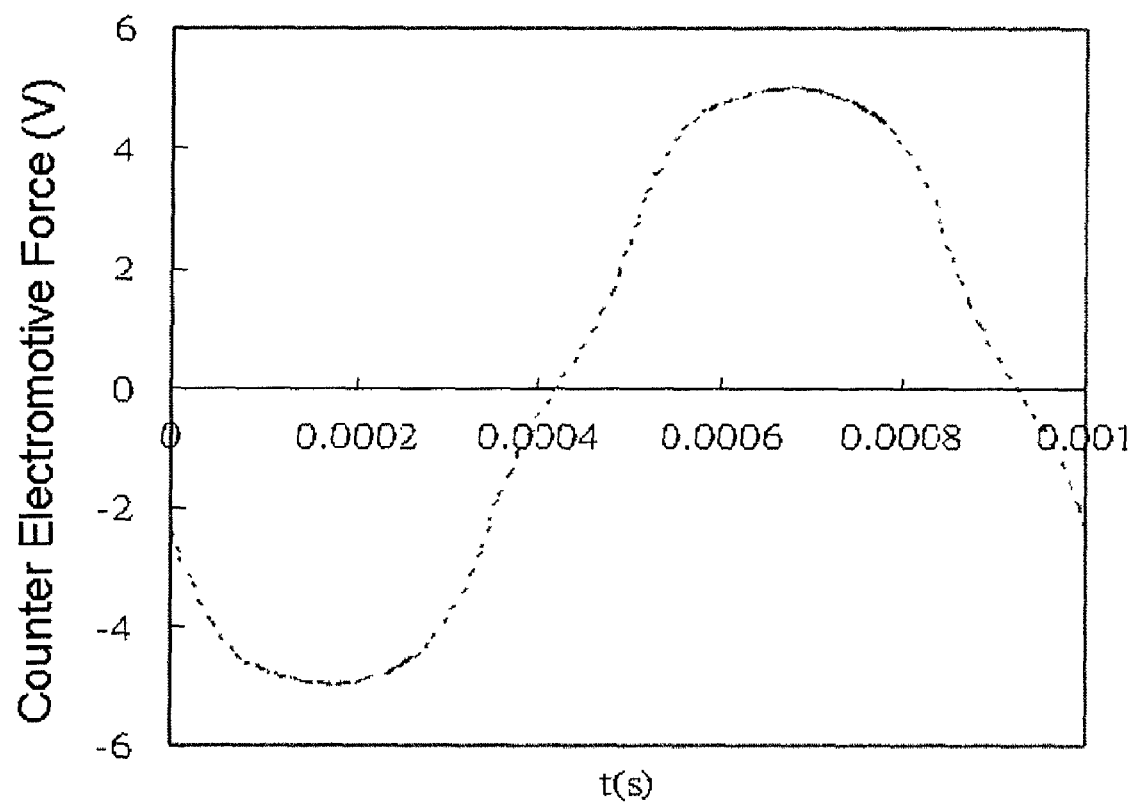
FIG. 18 is a diagram illustrating a counter electromotive force for a permanent magnet motor according to the present application.

The preceding step (c) further includes the following steps:

choosing the angular position for disposing the groove 10 in accordance with the symmetry, the uniformity of the grooves distribution, the convenience for disposing the grooves and the requirements of the counter electromotive force. Please refer to FIG. 18, which is a diagram illustrating a counter electromotive force for a permanent magnet motor according to the present application.

Figure 19:
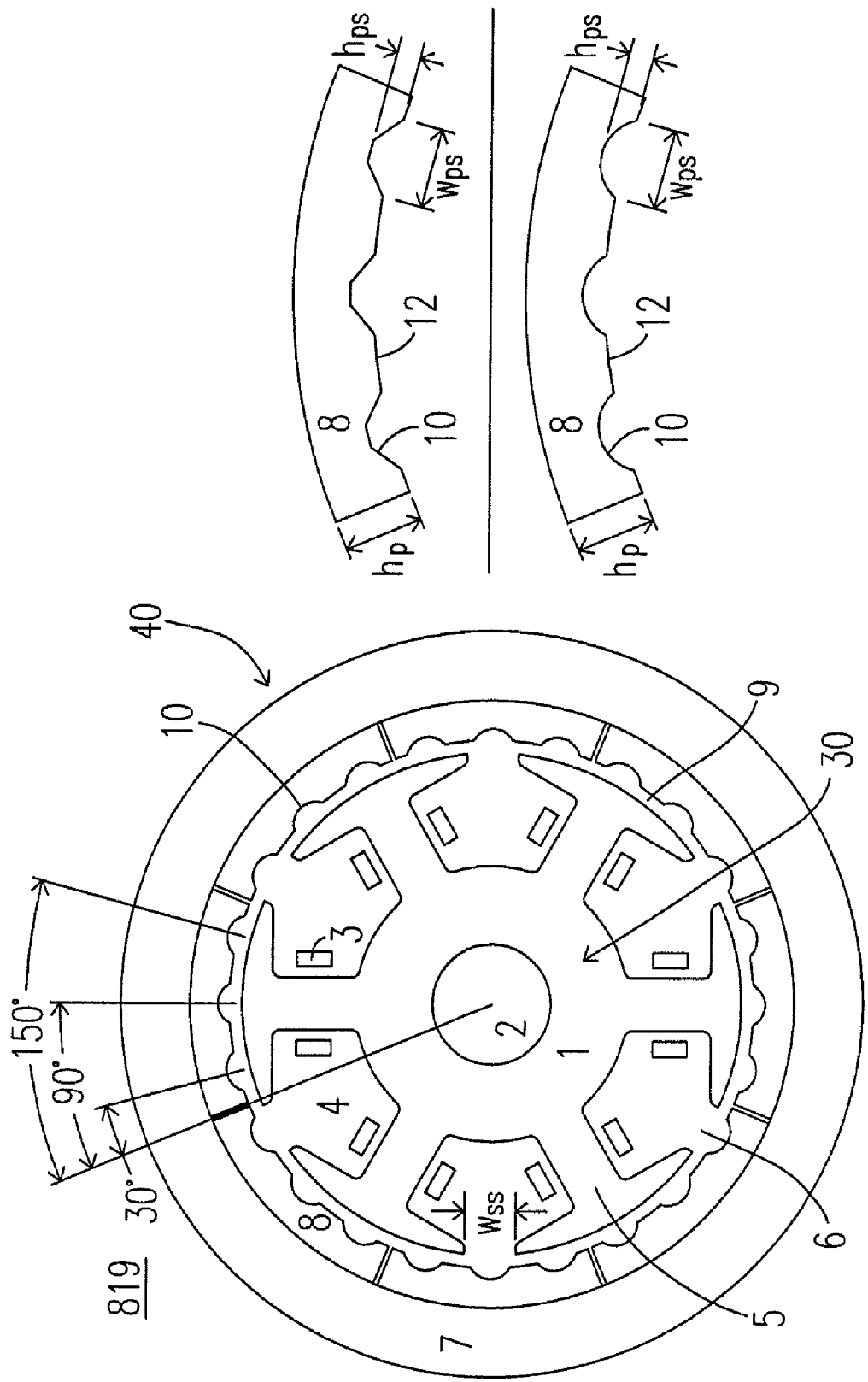
FIG. 19 is a cross-sectional view illustrating the first embodiment regarding the rotary structure of a permanent magnet motor for the present application.

Subsequently, a preferred embodiment of the present invention is presented as follows to demonstrate the preceding principle. Please refer to FIG. 19, which is a cross-sectional view illustrating the first embodiment regarding the rotary structure of a permanent magnet motor for the present application. The rotary structure 819 of the permanent magnet motor in FIG. 19 is based on the outer rotor permanent magnet motor illustrating in FIG. 1 but the structure for decreasing the cogging torque is further incorporated thereinto. The rotary structure 819 is a permanent magnet motor with eight poles and six slots, but it is not limited to the permanent magnet motor, and the same structure is also applicable to the permanent magnet generator. In FIG. 19, the rotary structure 819 of the permanent magnet motor includes a stator 30 and a rotor 40, in which the cylindrical stator 30 is fixed inside the inner space of permanent magnet motor in order to produce a rotating magnetic field. The stator 30 with the rotating magnetic field is encircled by the rotor 40 that is in circular shape and is coaxial with the stator 30. The magnetic field of the rotor 40 interacts with the rotating magnetic field provided by the stator 30 to cause the rotor 40 rotating.

The stator 30 of the rotary structure 819 includes a stator core 1, a stator shaft 2 and six windings 3, in which the stator core 1 is fixed to the stator shaft 2 and includes the magnetic materials. Six salient teeth 5 are extended from the stator core 1 and six winding slots 4 and six winding slot openings 6 are formed by the six salient teeth 5. Six windings 3 are winded on the six salient teeth 5 and the driving current flows through the six windings 3 in order to produce the rotating magnetic field of the stator 30.

The rotor 40 of the rotary structure 819 includes a rotor yoke 7 and eight permanent magnets 8, in which the rotor yoke 7 is in circular shape and the eight permanent magnets 8 are uniformly distributed in a circular shape along the inner surface of the rotor yoke 7. The N pole and the S pole of the eight permanent magnets 8 are alternatively exchanged, and each permanent magnet 8 is a magnetic pole including the magnetic material. The rotor 40 rotates around the stator shaft 2 of the stator 30 and an air gap 9 is formed among the outer surface of the salient teeth 5 of the stator 30, the winding slot openings 6 and the permanent magnets 8 of the rotor 40.

Figure 6:
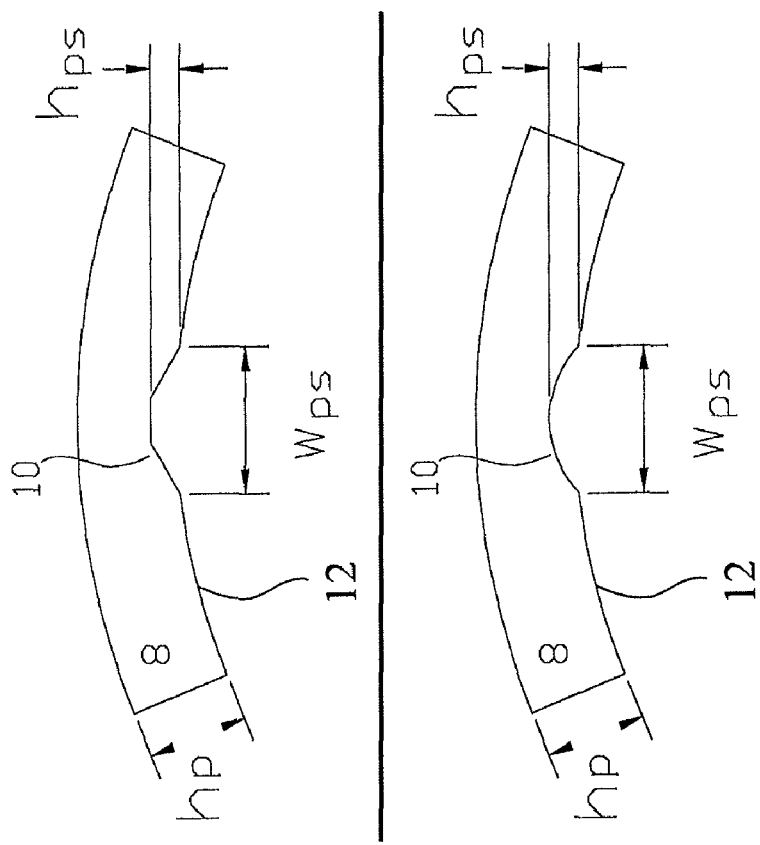
FIG. 6 is a cross-sectional view illustrating the embodiment regarding the rotary structure of a permanent magnet motor according to FIG. 19 of the present application.
Figure 6:
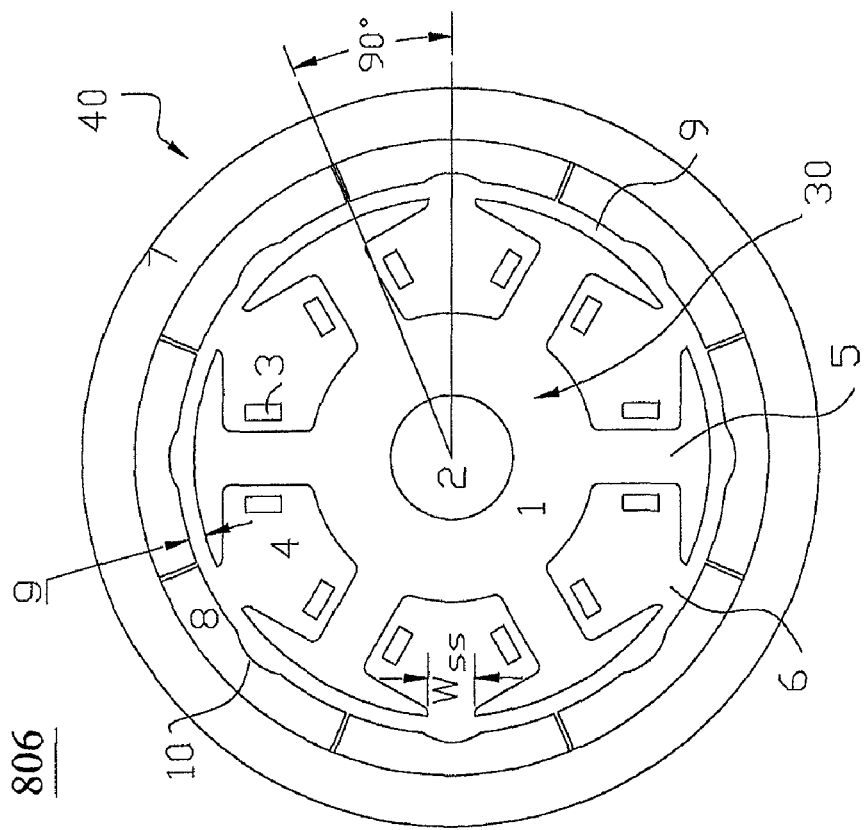

Besides, the arc surface 12 along the circumference direction of each permanent magnet 8 includes at least one groove 10 so as to reduce the cogging torque. The grooves 10 are in an arc cross section or a polygonal cross section. In the present preferred embodiment, the relevant computing parameters are defined as follows: P=4, K=6, M=24 and f=24. After computing, the preferred angular positions for disposing the grooves are at the electrical angles of 30°, 90° and 150°, as shown in FIG. 19. Please refer to FIG. 6, which is a cross-sectional view illustrating the rotary structure of a permanent magnet motor according to FIG. 19 of the present application. After considering the symmetry and the convenience for disposing the grooves in FIG. 19, it is chosen to dispose one groove at the arc surface 12 in every 90° along the circumference direction of each permanent magnet 8 to form the rotary structure 806 in FIG. 6. And the angle is formed by two lines connecting the two boundaries of two neighboring permanent magnets and intersecting at the center of the stator 30.

Figure 7:
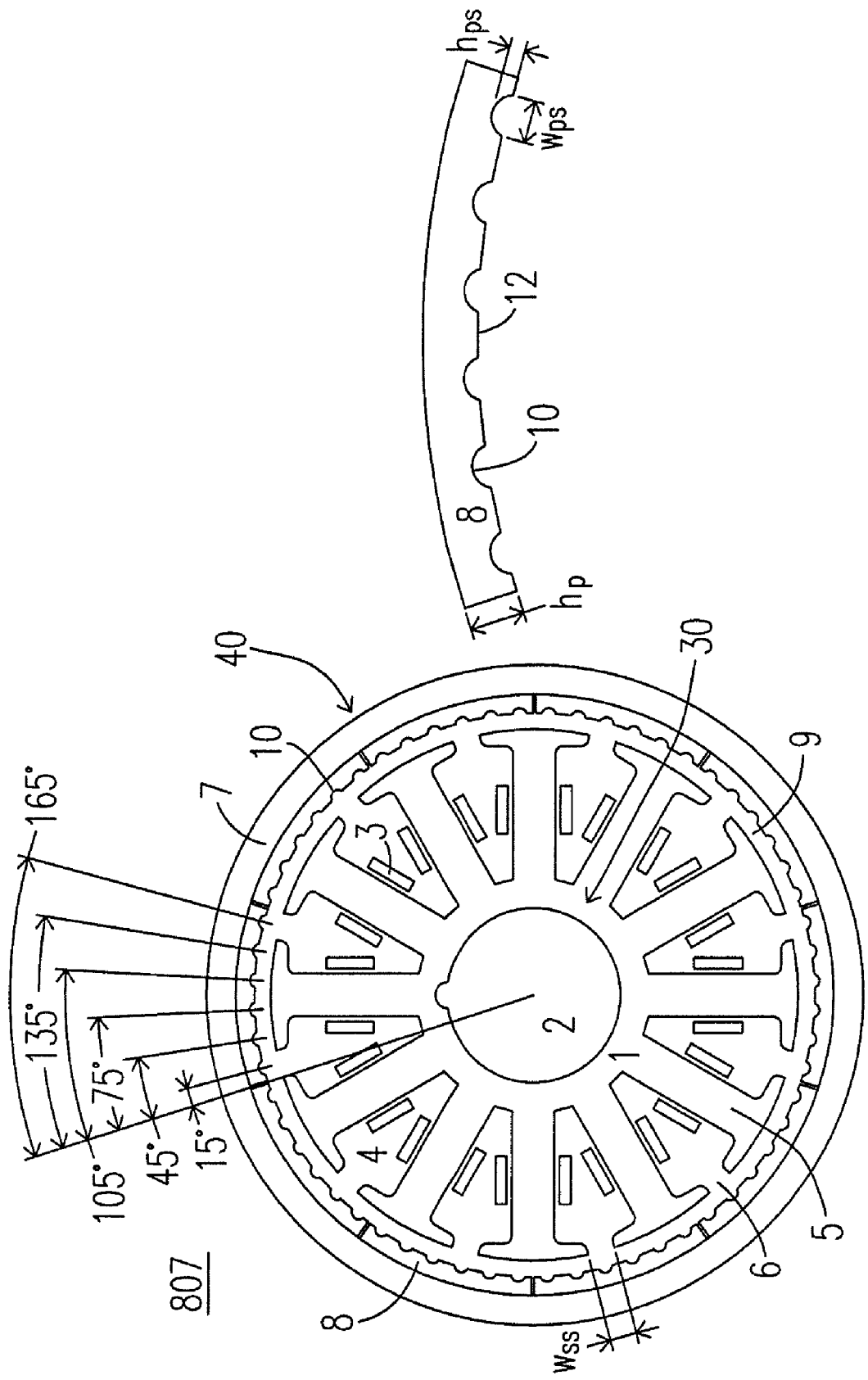
FIG. 7 is a cross-sectional view illustrating the second preferred embodiment regarding the rotary structure of a permanent magnet motor for the present application.
Figure 20:
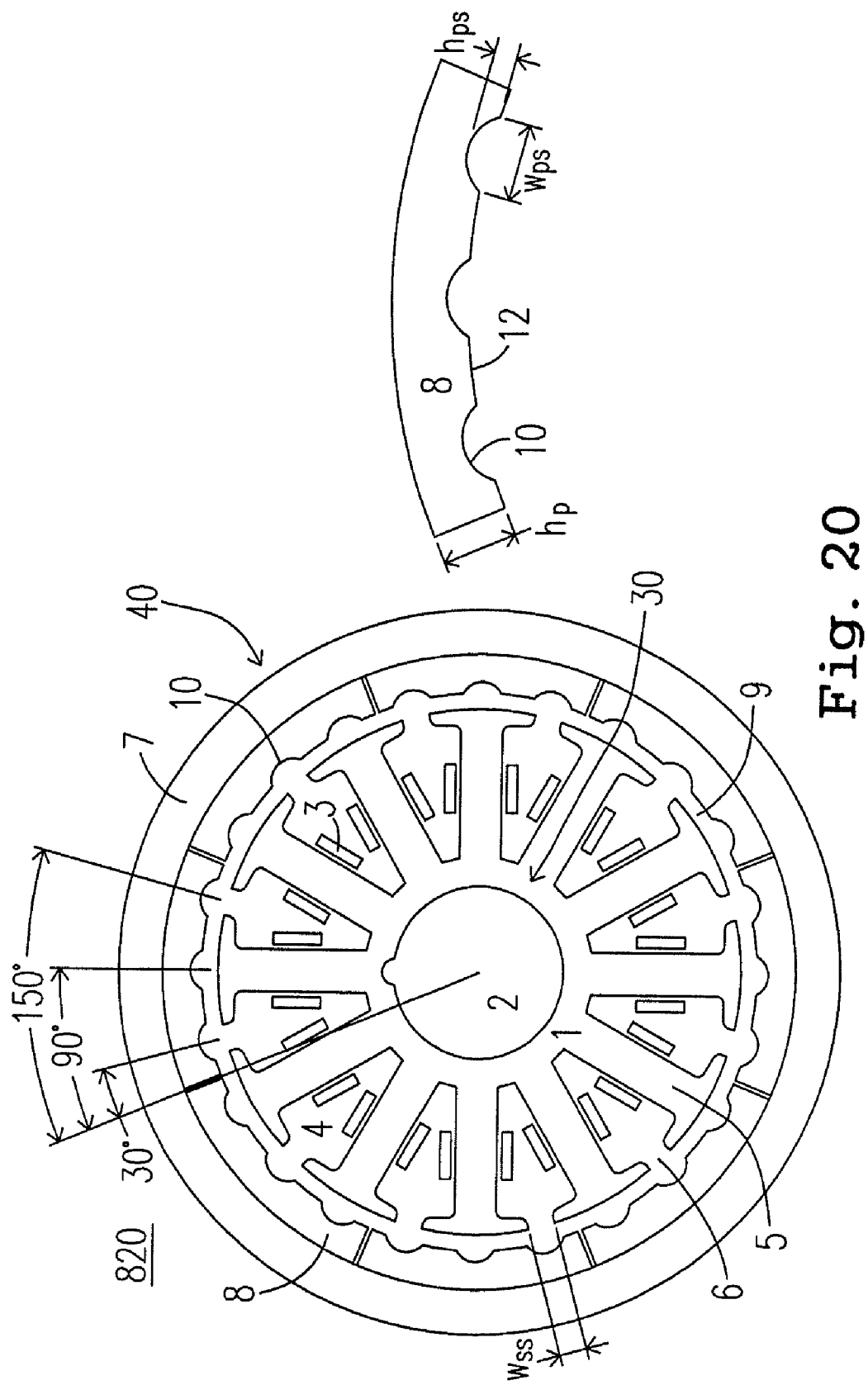
FIG. 20 is a cross-sectional view illustrating the third embodiment regarding the rotary structure of a permanent magnet motor for the present application.

Furthermore, a permanent magnet motor with ten poles and twelve slots is presented as an example for addressing the reduction of the cogging torque. Please refer to FIG. 7, which is a cross-sectional view illustrating the second embodiment regarding the rotary structure of a permanent magnet motor for the present application. The rotary structure 807 of the permanent magnet motor in FIG. 7 is based on the outer rotor permanent magnet motor illustrating in FIG. 2 but the structure for decreasing the cogging torque is further incorporated thereinto. Both FIGS. 2 and 7 share the same reference numerals for addressing the identical element. In order to reduce the cogging torque, at least one groove 10 is disposed at the arc surface 12 along the circumference direction of each permanent magnet 8 in FIG. 7. The structure demonstrated in this preferred embodiment is defined as follows: P=5, K=12, M=60 and f=60. After calculating, it is understood that the preferred angular positions for disposing the grooves are at the electrical angles of 15°, 45°, 75°, 105°, 135° and 165°, as shown in FIG. 7. After considering the symmetry and the convenience for disposing the grooves, it is chosen to dispose one groove on the arc surface 12 at 45° and 135° along the circumference direction of each permanent magnet 8. And the angle is formed by two lines connecting the two boundaries of two neighboring permanent magnets and intersecting at the center of the stator 30. Please refer to FIG. 20, which is a cross-sectional view illustrating the third embodiment regarding the rotary structure of a permanent magnet motor for the present application. In order to reduce the cogging torque, at least one groove 10 is disposed at the arc surface 12 along the circumference direction of each permanent magnet 8 in FIG. 20. The rotary structure 820 demonstrated in this preferred embodiment is defined as follows: P=4, K=12, M=24 and f=24. After calculating, it is understood that the preferred angular positions for disposing the grooves are at the electrical angles of 30°, 90° and 150° along the circumference direction of each permanent magnet 8, as shown in FIG. 20.

Figure 17:
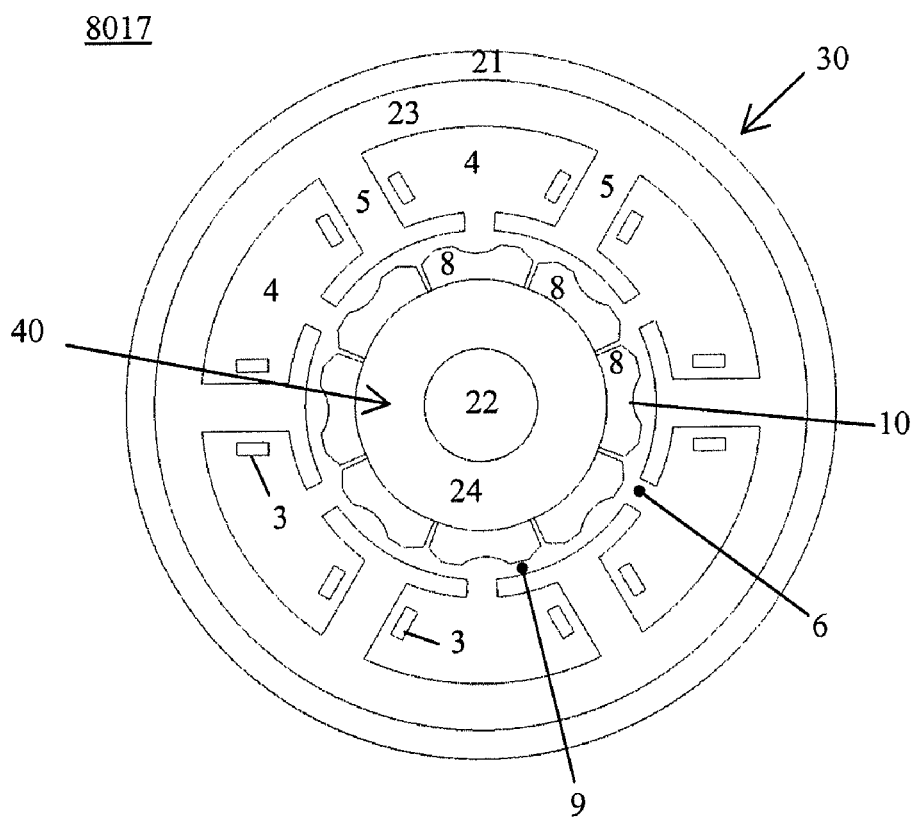
FIG. 17 is a cross-sectional view illustrating the embodiment regarding the rotary structure of an inner rotor permanent magnet motor according to the present application.
Figure 17:
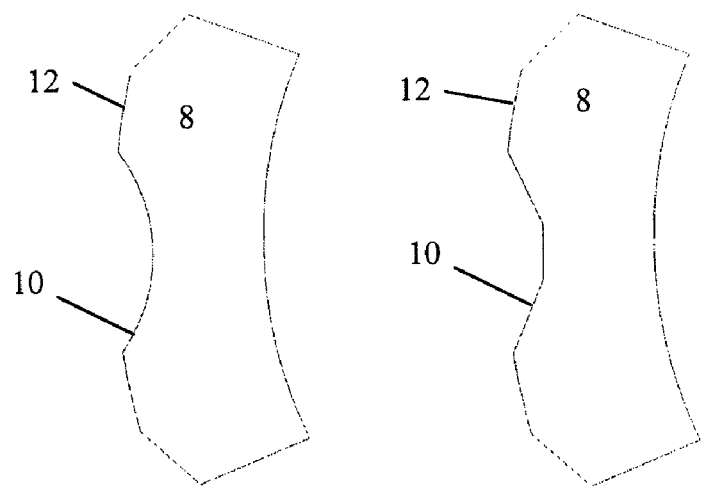

Furthermore, a permanent magnet motor with eight poles and six slots is presented as an example for addressing the reduction of the cogging torque. Please refer to FIG. 17, which is a cross-sectional view illustrating the embodiment regarding the rotary structure of an inner rotor permanent magnet motor according to the present application. The rotary structure 8017 of the inner rotor permanent magnet motor includes a stator 30 and a rotor 40, in which the circular stator 30 is fixed so as to form an external structure of the permanent magnet motor and to produce a rotating magnetic field. The cylindrical rotor 40 having a rotor magnetic field is encircled by the stator 30 and is coaxial with the stator 30. The magnetic field of the rotor interacts with the rotating magnetic field provided by the stator 30 to cause the rotor 40 rotating.

The stator 30 of the inner rotor permanent magnet motor includes a stator ring 21 and six windings 3, in which the stator ring 21 is in circular shape, symmetric to a rotor shaft 22 and including the magnetic material. The stator ring 21 includes an outer stator yoke 23 and six salient teeth 5. The six salient teeth 5 are extended from the stator yoke 23 towards the rotor shaft 22 and are uniformly distributed corresponding to the rotor shaft 22. Six winding slots 4 and six winding slot openings 6 are formed by the six salient teeth 5, and six windings 3 are winded on the six salient teeth 5. The driving current flows through the six windings 3 such that the rotating magnetic field of the stator 30 is produced accordingly.

The rotor 40 of the inner rotor permanent magnet motor includes a rotor core 24 and eight permanent magnets 8, in which the rotor core 24 is in cylindrical shape and the eight permanent magnets 8 are uniformly distributed on the surface of the rotor core 24 corresponding to the rotor shaft 22. The N pole and the S pole of the eight permanent magnets 8 are alternatively exchanged. Each of the eight permanent magnets 8 is a magnetic pole including the magnetic material. The rotor 40 rotates with the rotor shaft 22 and an air gap 9 is formed among the inner surface of the six salient teeth 5 of the rotor 30, the winding slot openings 6 and the permanent magnets 8 of the rotor 40.

Besides, the arc surface along the circumference direction of each permanent magnet includes at least one groove so as to reduce the cogging torque. The grooves are in an arc cross section or a polygonal cross section. In the present preferred embodiment, the relevant computing parameters are defined as follows: P=4, K=6, M=24 and f=24. After computing, the preferred angular position for disposing the grooves are at the electrical angles of 30°, 90° and 150°. After considering the symmetry and the convenience for disposing the grooves, it is chosen to dispose one groove at the arc surface in every 90° along the circumference direction of each permanent magnet. And the angle is formed by two lines connecting the two boundaries of two neighboring permanent magnets and intersecting at the center of the stator.

Figure 3:
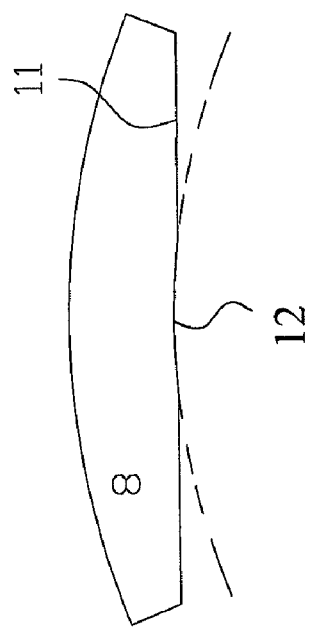
FIG. 3 is a cross-sectional view illustrating the rotary structure of a third kind of a conventional outer rotor permanent magnet motor.
Figure 3:
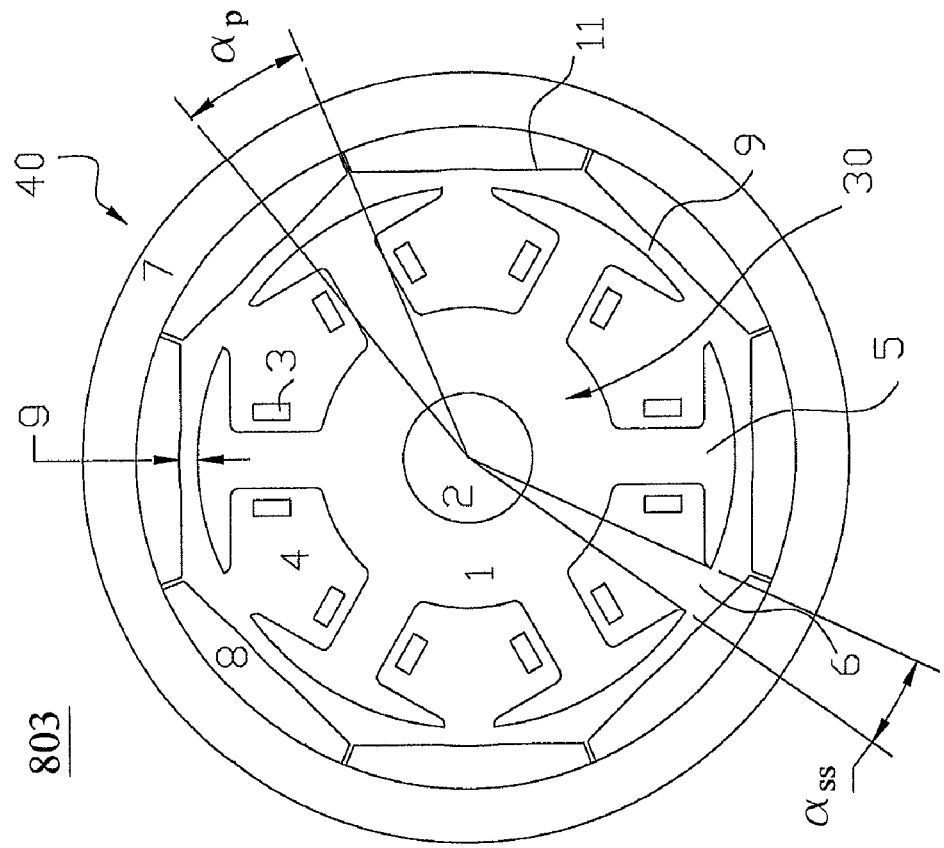
Figure 4:
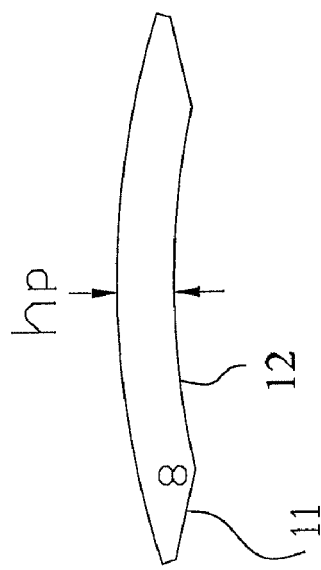
FIG. 4 is a cross-sectional view illustrating the rotary structure of a fourth kind of a conventional outer rotor permanent magnet motor.
Figure 4:
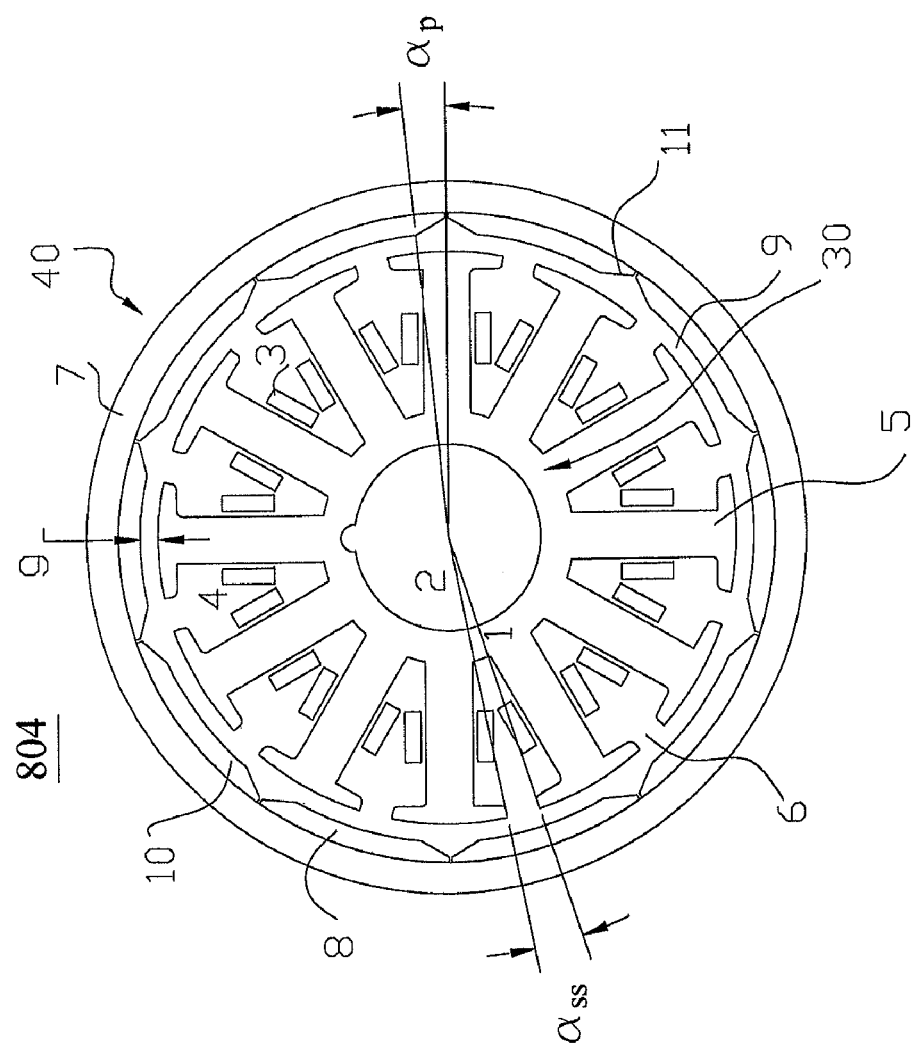
Figure 5:
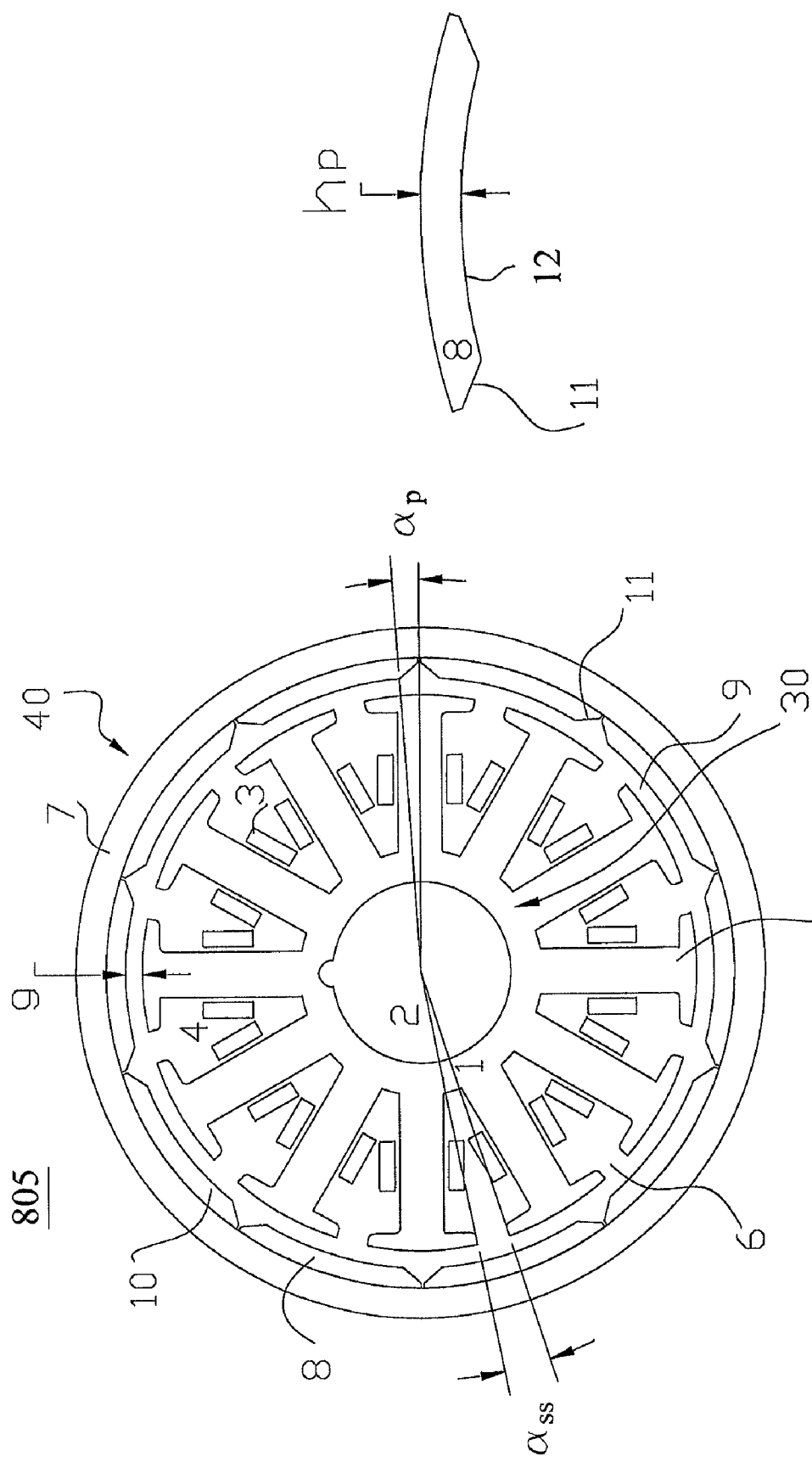
FIG. 5 is a cross-sectional view illustrating the rotary structure of a fifth kind of a conventional outer rotor permanent magnet motor.

In the prior arts, the rotary structure of a conventional outer rotor permanent magnet motor introduced in the preceding FIG. 3, FIG. 4 and FIG. 5 and the rotary structure of a conventional inner rotor permanent magnet motor corresponding to what is introduced in the preceding FIG. 3, FIG. 4 and FIG. 5 further includes a pair of arc-cut surfaces formed at two sides of each permanent magnet along the circumference direction so as to reduce the cogging torque. The pairs of arc-cut surfaces are symmetrically distributed to each other along the radial direction of each permanent magnet and the thickness at the terminal side of each permanent magnet gradually becomes thinner along the circumference direction. In order to further reduce the cogging toque of the permanent magnet motor, constrained by the condition that each pair of the arc-cut surface of each permanent magnet, in accordance with the ratio of the total number of the poles and the total number of the slots, P/K, the corresponding disposing angle for the groove within a specific angular range along the circumference direction is adjusted, and in accordance with the ratio of half of the total number of the poles and the wave-cyclic number, P/f, the grooves with adequate size at the proper location on the arc surface 12 of the permanent magnets is disposed. The cogging torque is thus dramatically decreased.

Therefore, based on the preceding principle, the method reducing the cogging torque of the permanent magnet motor includes following steps:

(p) determining the wave-cyclic number of the cogging torque under the status that there is not any groove on the arc-cut surface of permanent magnet.

(q) choosing an angle, $\alpha_p$, along the circumference direction within a angular range of: $\alpha_{min}-0.8\alpha_{ss} \leq \alpha_p \leq \alpha_{min}+0.8\alpha_{ss}$, for each angular range corresponding to the pair of the arc-cut surfaces, in which $\alpha_{min}=180 \times \min(\text{Mod}((2P/K)i,1), i=1, 2, \ldots, n-1)$, $\alpha_{ss}$ is an electrical angle corresponding to a slot opening width $w_{ss}$ of one of the winding slots 6, $n=M/(2P)$, M is a lowest common multiple of 2P and K, Mod( ) is a remainder operator to compute the remainder and min( ) is a minimum value operator. And the angle is formed by two lines connecting the two boundaries of two neighboring permanent magnets and intersecting at the center of the stator.

(r) determining the phase difference between the cogging torque wave with the arc-cut surfaces and the cogging torque wave without the arc-cut surfaces under the status that there is not any groove on the arc-cut surface of the permanent magnets.

(s) determining the wave-cyclic number of the cogging torque under the status that the permanent magnets has no groove 10 but has the arc-cut surface 11, and usually the wave-cyclic number is equal to that under the status that the permanent magnet has no groove on the arc-cut surface.

(t) calculating the angular position of the n electrical angular positions:

$180 \times \text{Mod}((2P/K)i-P/f+\beta_0 P/(180f),1)$, where $n=M/(2P)$, M is a lowest common multiple of 2P and K, Mod( ) is a remainder operator, f is a wave-cyclic number of the cogging torque per rotation in the absence of the groove on the arc surface of the permanent magnet, and $\beta_0$ is the phase difference between the cogging torque wave without the arc-cut surfaces and the cogging torque wave with the arc-cut surfaces. And the angle is formed by two lines connecting the two boundaries of two neighboring permanent magnets and intersecting at the center of the stator.

(u) choosing at least one specific angular position from n angular positions and a groove 10 is disposed at each chosen angular position on the arc surface of the permanent magnet.

The preceding step (u) further includes the following steps: choosing the angular position for disposing the groove 10 in accordance with the symmetry, the uniformity of the grooves distribution, the convenience for disposing the grooves and the requirements of the counter electromotive force.

Figure 8:
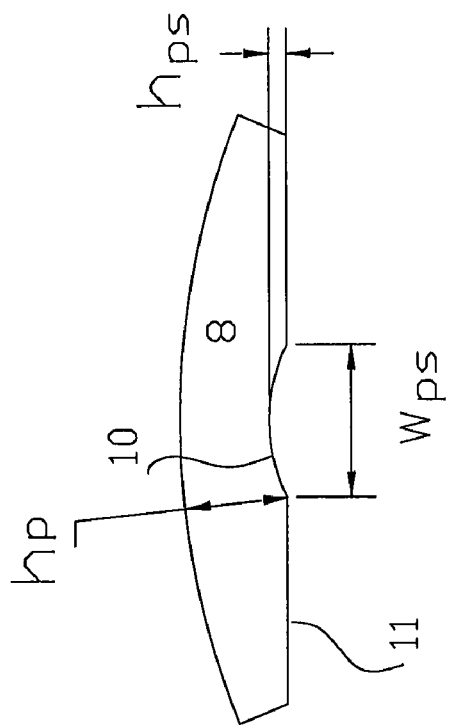
FIG. 8 is a cross-sectional view illustrating the embodiment regarding the rotary structure of a permanent magnet motor according to FIG. 21 of the present application.
Figure 8:
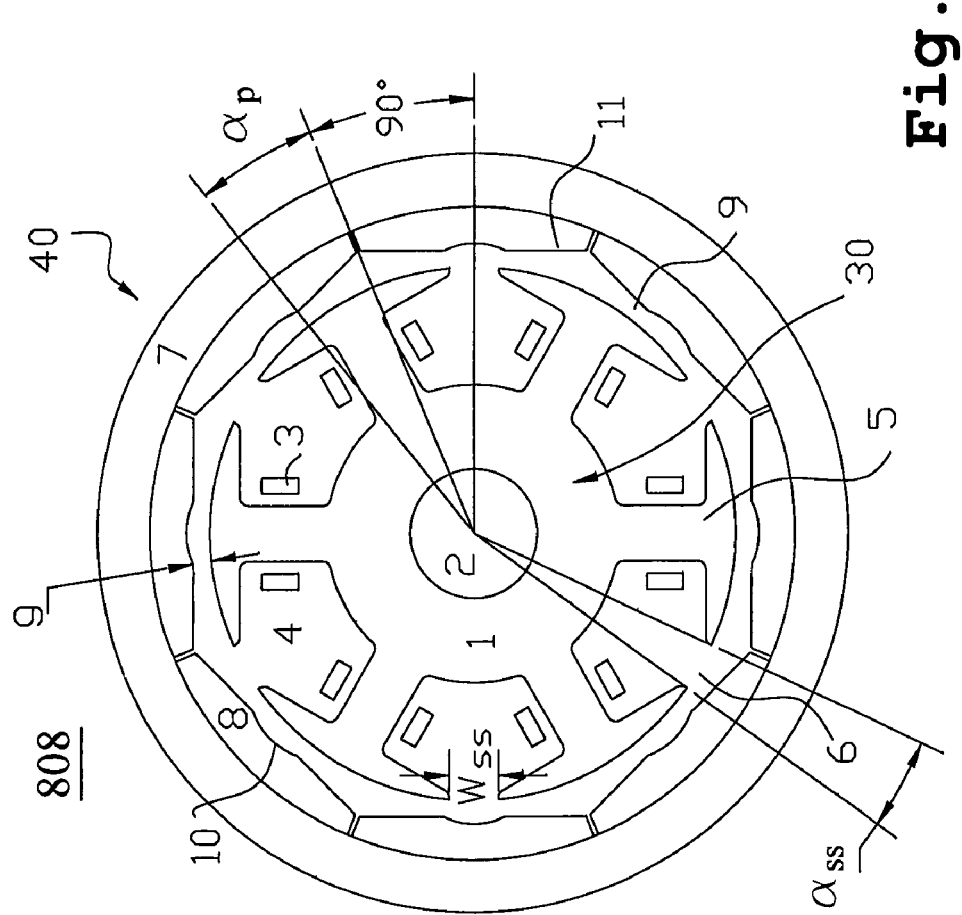
Figure 21:
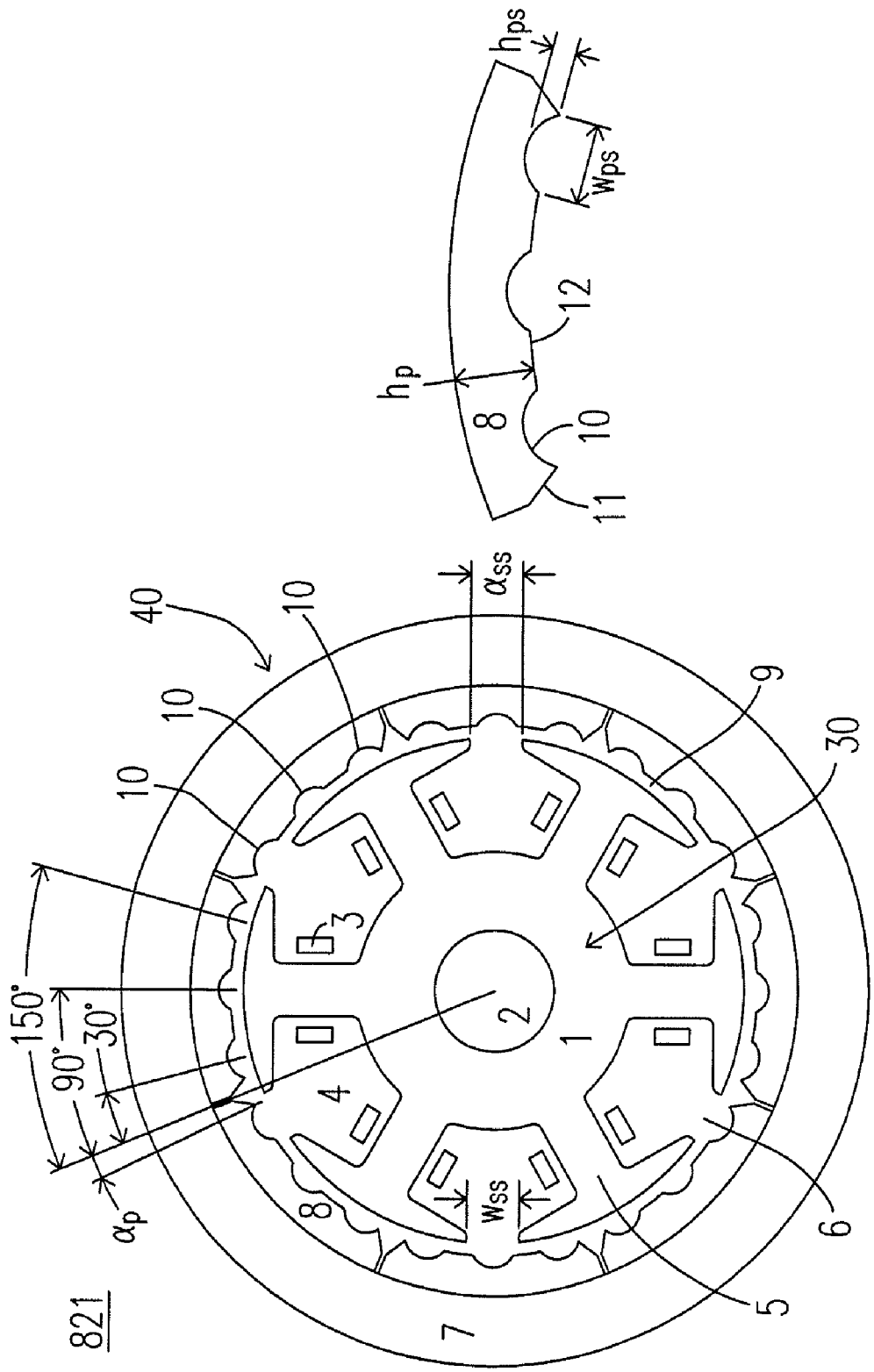
FIG. 21 is a cross-sectional view illustrating the fourth embodiment regarding the rotary structure of a permanent magnet motor for the present application.

Subsequently, a preferred embodiment of the present invention is presented as follows to demonstrate the preceding principle. Please refer to FIG. 21, which is a cross-sectional view illustrating the fourth embodiment regarding the rotary structure of a permanent magnet motor for the present application. The rotary structure 821 of the permanent magnet motor in FIG. 21 is based on the outer rotor permanent magnet motor illustrating in FIG. 19, and the relevant computing parameters are defined as follows: P=4, K=6, M=24, f=24 and $\beta_0=0°$. In accordance with step (q), calculating and choosing an angle, $\alpha_p$, along the circumference direction within an angular range for each angular range corresponding to the pair of the arc-cut surface 11 of the permanent magnets 8. In accordance with step (t): after calculating, the preferred angular positions for disposing the grooves 10 are at the electrical angles of 30°, 90° and 150° along the circumference direction of each permanent magnet 8, as shown in FIG. 21. Please refer to FIG. 8, which is a cross-sectional view illustrating the embodiment regarding the rotary structure of a permanent magnet motor according to FIG. 21 of the present application. The rotary structure 808 of the permanent magnet motor in FIG. 8 is based on the outer rotor permanent magnet motor illustrating in FIG. 3 but the structure for reducing the cogging torque is further incorporated thereinto. FIGS. 21, 3, 6 and 8 share the same reference numerals for addressing the identical element. In the present preferred embodiment, the relevant computing parameters are defined as follows: P=4, K=6, M=24 and f=24. In accordance with step (q), calculating and choosing an angle, $\alpha_p$, along the circumference direction within an angular range for each angular range corresponding to the pair of the arc-cut surface 11 of the permanent magnets 8. The phase difference, $\beta_0$, between the cogging torque wave without the arc-cut surfaces and the cogging torque wave with the arc-cut surfaces while there is not any groove on the permanent magnet is required during the procedure for determining the structure reducing the cogging torque. The information regarding the phase difference, $\beta_0$, is included in FIG. 9.

Figure 9:
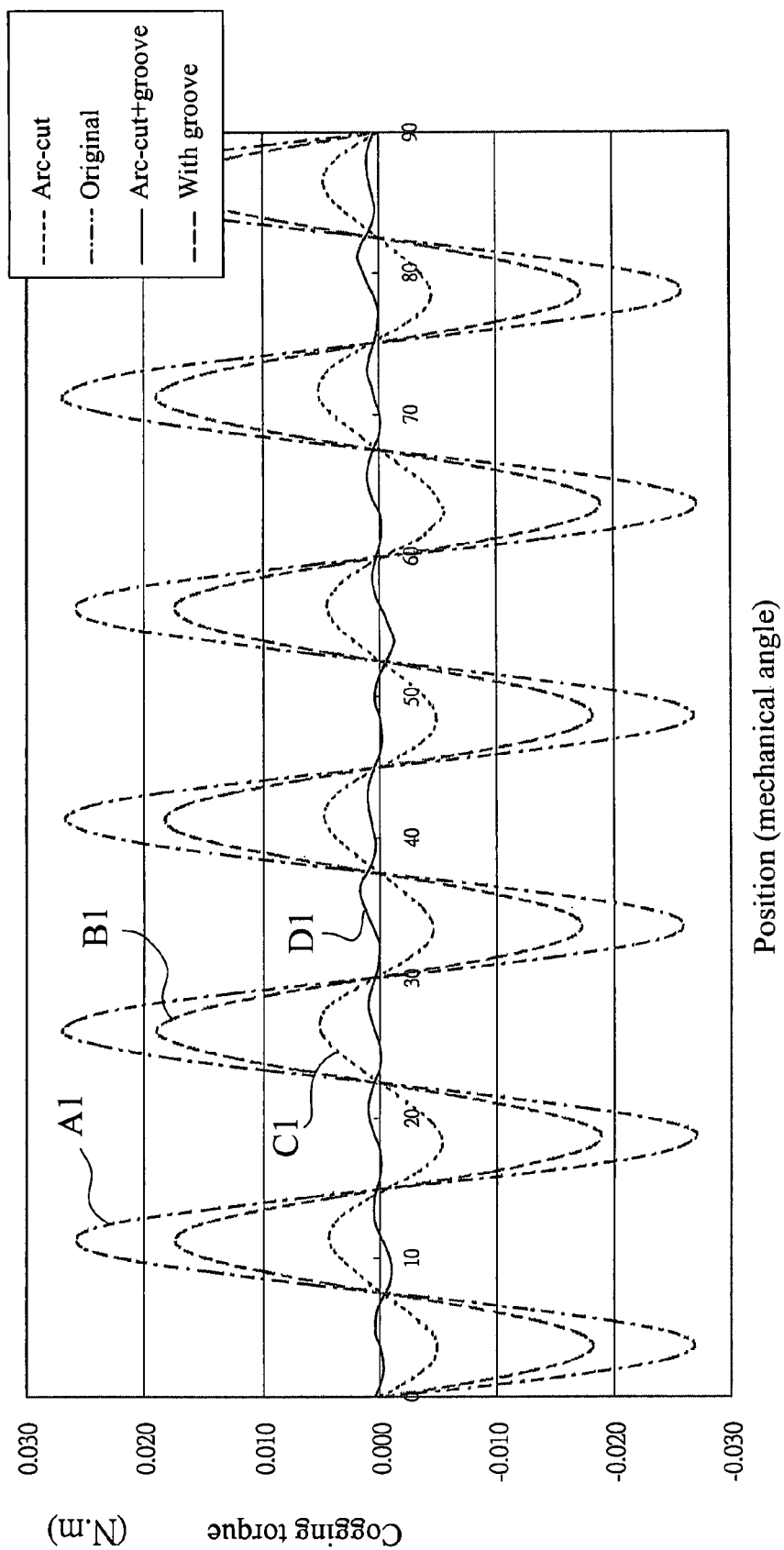
FIG. 9 is a diagram illustrating the variation of the cogging torque of a permanent magnet motor with respect to a mechanical angle corresponding to FIG. 1, FIG. 3, FIG. 6 and FIG. 8.

Please refer to FIG. 9, which is a diagram illustrating the variation of the cogging torque of a permanent magnet motor with respect to a mechanical angle corresponding to FIG. 1, FIG. 3, FIG. 6 and FIG. 8. All of the permanent magnet motor illustrating in FIG. 1, FIG. 3, FIG. 6 and FIG. 8 are a permanent magnet motor with eight poles and six slots. However, in FIG. 9, waveform A1 is the cogging torque wave of a permanent magnet motor illustrating in FIG. 1. It is realized from waveform A1 that for four kinds of conditions in FIG. 1, the permanent magnet motor bears the maximum cogging torque while not any groove or arc-cut surface on the permanent magnets 8. The waveform B1 is the cogging torque wave of a permanent magnet motor illustrating in FIG. 6. It is realized from waveform B1 that disposing the groove at the proper location on the arc surface of the permanent magnet is able to efficiently reduce the cogging torque of the permanent magnet. The waveform C1 is the cogging torque wave of a permanent magnet motor illustrating in FIG. 3. It is realized from waveform C1 that forming a pair of symmetrical arc-cut surfaces at two sides of each permanent magnet is able to efficiently reduce the cogging torque of the permanent magnet and performs better effect than that in FIG. 6. The waveform D1 is the cogging torque wave of a permanent magnet motor illustrating in FIG. 8. It is realized from waveform D1 that forming a pair of symmetrical arc-cut surfaces at two sides of each permanent magnet and simultaneously disposing the groove at the proper location on the arc surface of the permanent magnet is able to obtain a minimum of the cogging torque for the permanent magnet motor, and its wave-cyclic number of the cogging torque is twice of those of other three conditions. Besides, it is concluded through comparing wave A1 and wave C1 that the phase difference, $\beta_0$, between the cogging torque wave with arc-cut surface and the cogging torque wave without arc-cut surface when there is not any groove disposed is 0.

Figure 22:
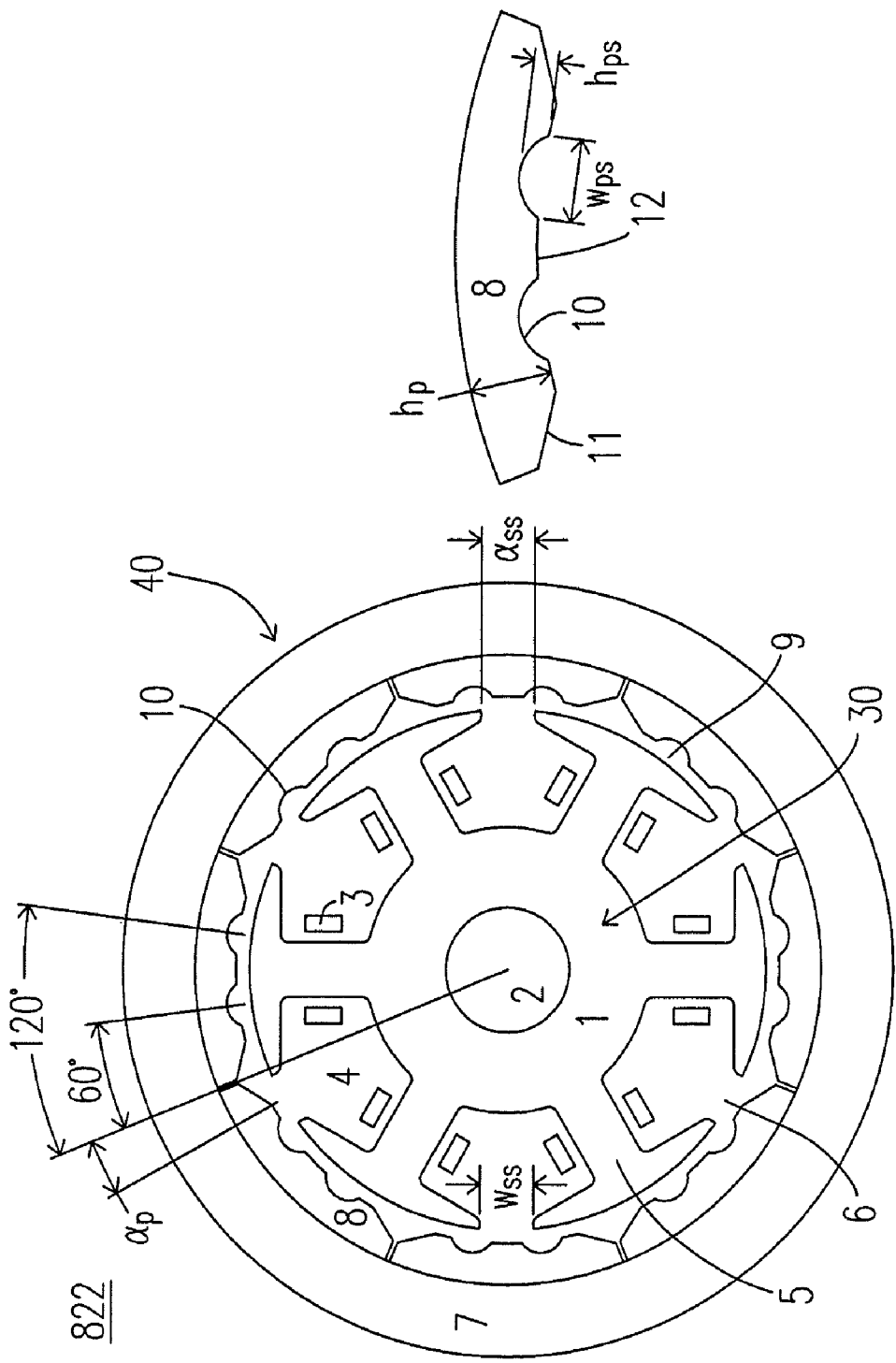
FIG. 22 is a cross-sectional view illustrating the fifth embodiment regarding the rotary structure of a permanent magnet motor for the present application.

Please further refer to FIG. 8, in accordance with step (t): after calculating, the preferred angular positions for disposing the grooves 10 are at the electrical angles of 30°, 90° and 150°. After considering the symmetry and the convenience for disposing the grooves, it is chosen to dispose one groove 10 at the arc surface 12 in every 90° along the circumference direction of each permanent magnet 8. And the angle is formed by two lines connecting the two boundaries of two neighboring permanent magnets and intersecting at the center of the stator 40. Please refer to FIG. 22, which is a cross-sectional view illustrating the fifth embodiment regarding the rotary structure of a permanent magnet motor for the present application. The rotary structure 822 of the permanent magnet motor in FIG. 22 is based on the outer rotor permanent magnet motor illustrating in FIG. 19, and the relevant computing parameters are defined as follows: P=4, K=6, M=24, f=24 and $\beta_0$=180°. In accordance with step (q), calculating and choosing an angle, $\alpha_p$, along the circumference direction within an angular range for each angular range corresponding to the pair of the arc-cut surface 11 of the permanent magnets 8. In accordance with step (t): after calculating, the preferred angular positions for disposing the grooves 10 are at the electrical angles of 60° and 120° along the circumference direction of each permanent magnet 8, as shown in FIG. 22.

Figure 10:
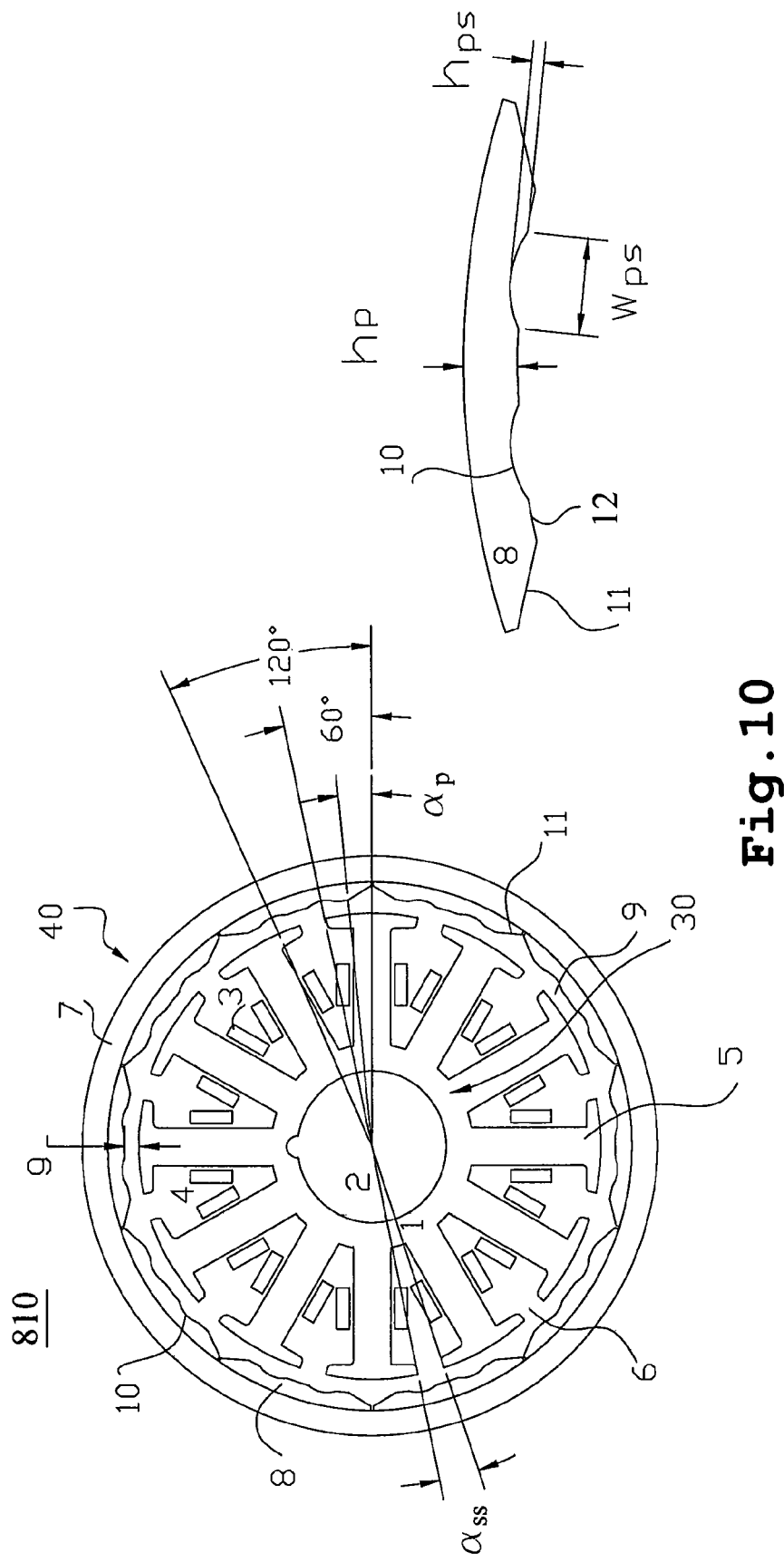
FIG. 10 is a cross-sectional view illustrating the embodiment regarding the rotary structure of a permanent magnet motor according to FIG. 23 of the present application.
Figure 23:
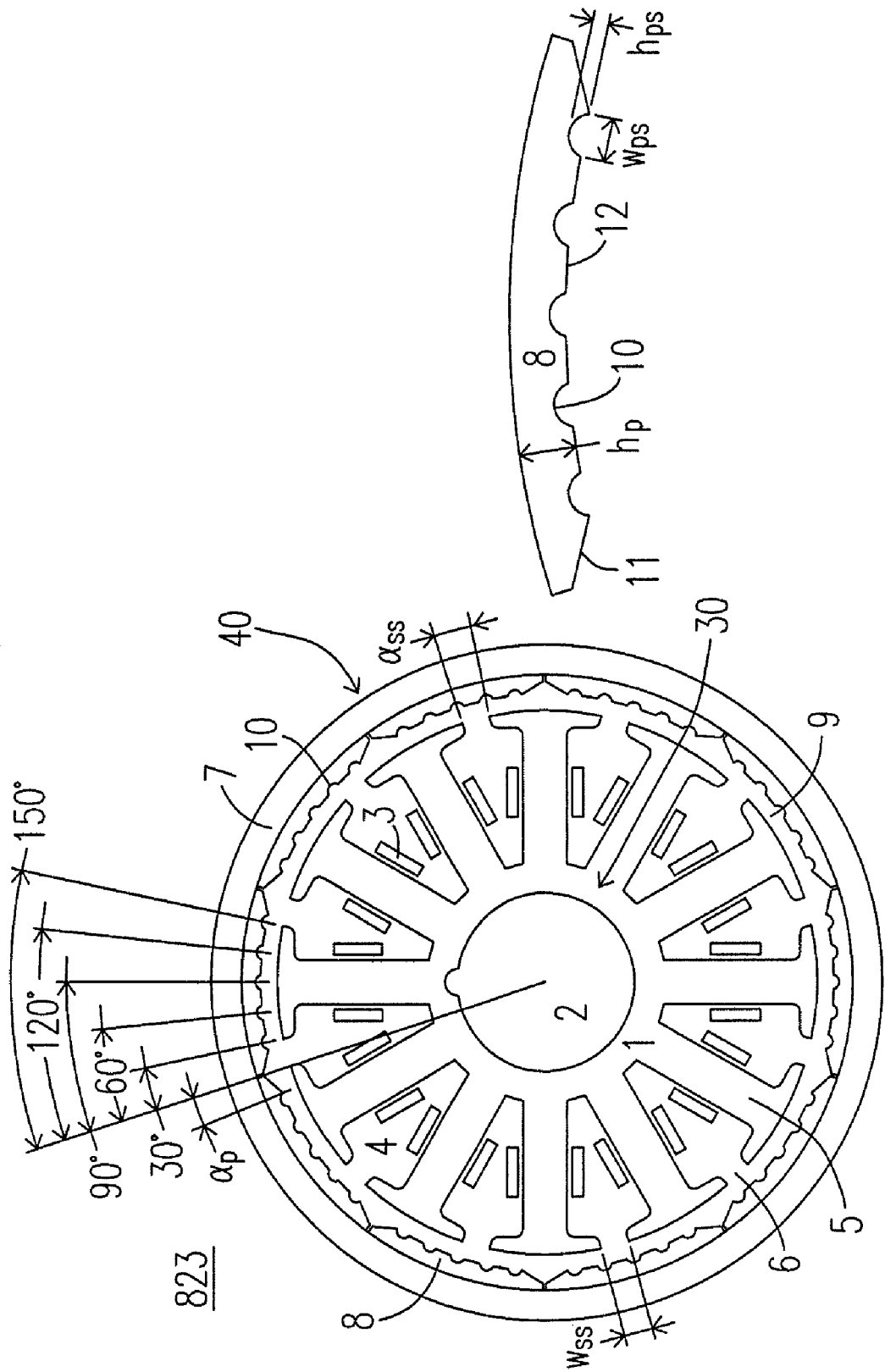
FIG. 23 is a cross-sectional view illustrating the sixth embodiment regarding the rotary structure of a permanent magnet motor for the present application.

Please refer to FIG. 23, which is a cross-sectional view illustrating the sixth embodiment regarding the rotary structure of a permanent magnet motor for the present application. The rotary structure 823 of the permanent magnet motor in FIG. 23 is based on the outer rotor permanent magnet motor illustrating in FIG. 7, and the relevant computing parameters are defined as follows: P=5, K=12, M=60, f=60 and $\beta_0$=180°. In accordance with step (q), calculating and choosing an angle, $\alpha_p$, along the circumference direction within an angular range for each angular range corresponding to the pair of the arc-cut surface 11 of the permanent magnets 8. In accordance with step (t): after calculating, the preferred angular positions for disposing the grooves 10 are at the electrical angles of 30°, 60°, 90°, 120° and 150° along the circumference direction of each permanent magnet 8, as shown in FIG. 23. Please further refer to FIG. 10, which is a cross-sectional view illustrating the preferred embodiment regarding the rotary structure of a permanent magnet motor according to FIG. 23 of the present application. The rotary structure 810 of the permanent magnet motor in FIG. 10 is based on the outer rotor permanent magnet motor illustrating in FIG. 4 but the structure for reducing the cogging torque is further incorporated thereinto. FIGS. 23, 4 and 10 share the same reference numerals for addressing the identical element. The parameters applied in this preferred embodiment are defined as follows: P=5, K=12, M=60 and f=60. In accordance with step (q), calculating the angle, $\alpha_p$, along the circumference direction within an angular range for each angular range corresponding to the pair of the arc-cut surfaces 11 of each permanent magnet 8. The phase difference between the cogging torque wave with the arc-cut surfaces and the cogging torque wave without the arc-cut surfaces for no groove 10 on the arc-cut surfaces 11 of each permanent magnet 8 is required for the procedure determining the structure for reducing the cogging torque. The information regarding the phase difference, $\beta_0$, is included in FIG. 11.

Figure 2:
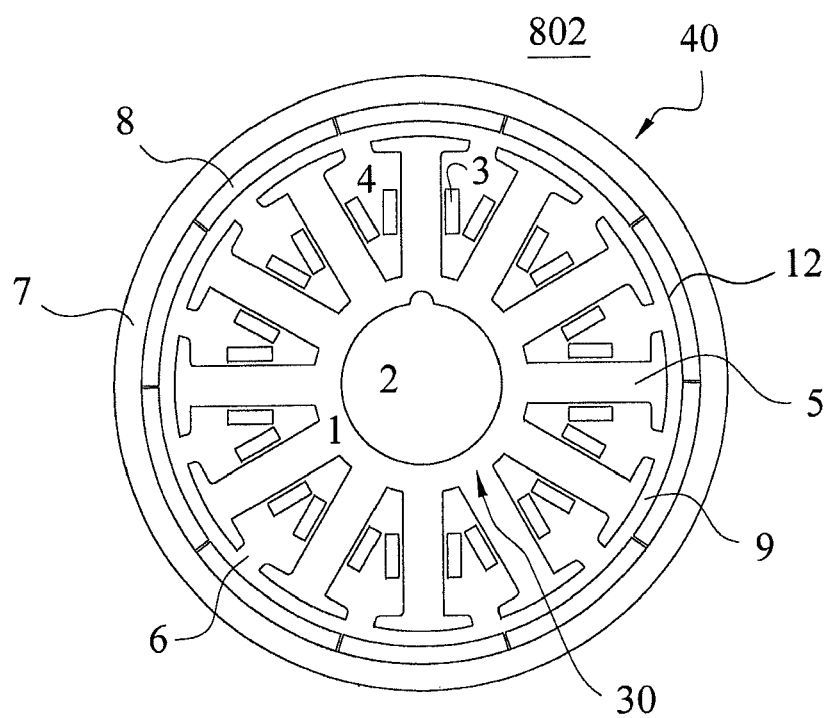
FIG. 2 is a cross-sectional view illustrating the rotary structure of a second kind of a conventional outer rotor permanent magnet motor.
Figure 11:
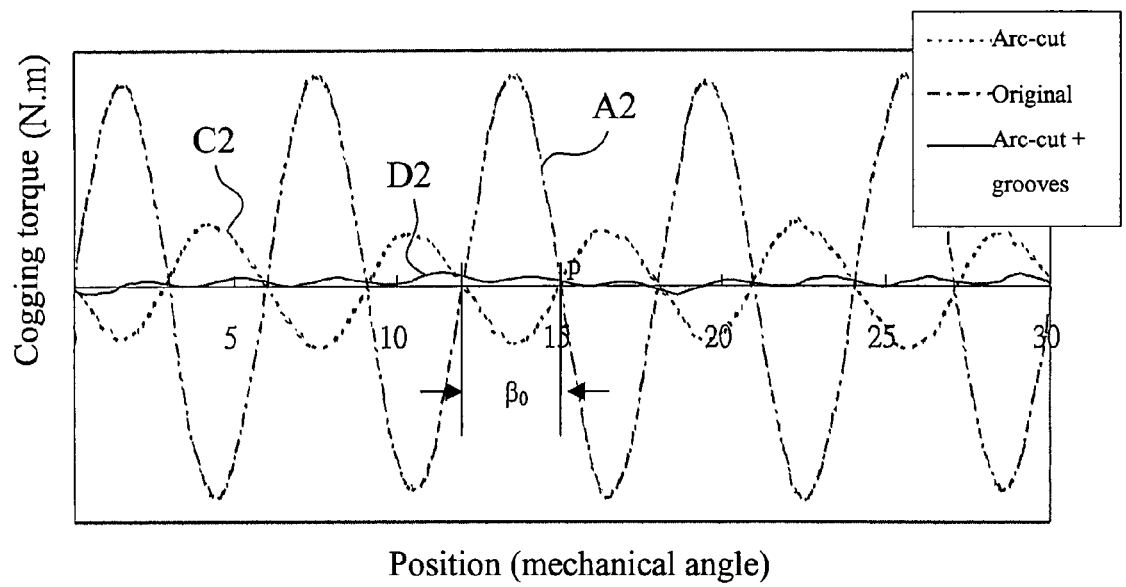
FIG. 11 is a diagram illustrating the variation of the cogging torque of a permanent magnet motor with respect to a mechanical angle corresponding to FIG. 2, FIG. 4 and FIG. 10.

Please refer to FIG. 11, which is a diagram illustrating the variation of the cogging torque of a permanent magnet motor with respect to a mechanical angle corresponding to FIG. 2, FIG. 4 and FIG. 10. All of the permanent magnet motor illustrating in FIG. 2, FIG. 4 and FIG. 10 are a permanent magnet motor with ten poles and twelve slots. In FIG. 9, waveform A2 is the cogging torque wave of a permanent magnet motor illustrating in FIG. 2. It is realized from waveform A2 that for three kinds of conditions in FIG. 2, the permanent magnetic motor bears the maximum cogging torque while not any groove or arc-cut surface is on the permanent magnets 8. The waveform C2 is the cogging torque wave of a permanent magnet motor illustrating in FIG. 4. It is realized from waveform C2 that forming a pair of symmetrical arc-cut surfaces 11 at two sides of each permanent magnet 8 is able to efficiently reduce the cogging torque of the permanent magnets 8. The waveform D2 is the cogging torque wave of a permanent magnet motor illustrating in FIG. 10. It is realized from waveform D2 that forming a pair of symmetrical arc-cut surfaces 11 at two sides of each permanent magnet 8 and simultaneously disposing the groove 10 at the proper location on the arc surface 12 of the permanent magnet 8 is able to obtain a minimum of the cogging torque for the permanent magnet motor, and its wave-cyclic number of the cogging torque is twice of those of other three conditions. Besides, it is concluded through comparing the wave A2 and the wave C2 that the phase difference, $\beta_0$, between the cogging torque wave with arc-cut surfaces 11 and the cogging torque wave without arc-cut surface 11 when there is not any groove 10 disposed on the permanent magnets 8 is 180°.

Figure 24:
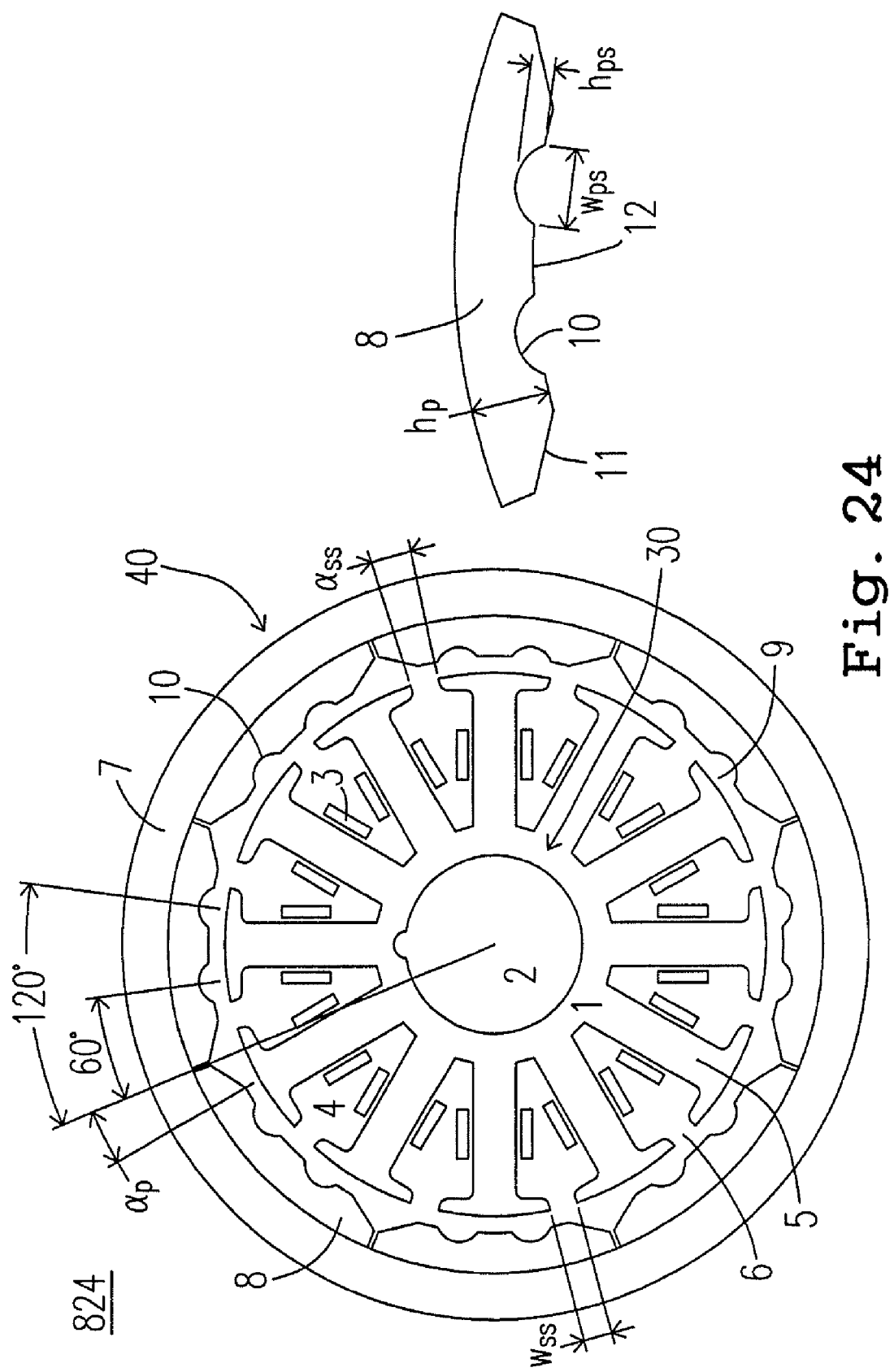
FIG. 24 is a cross-sectional view illustrating the seventh embodiment regarding the rotary structure of a permanent magnet motor for the present application.

Please further refer to FIG. 10, in accordance with step (t): after calculating, the preferred angular positions for disposing the grooves 10 are at the electrical angles of 30°, 60°, 90°, 120° and 150°. After considering the symmetry and the convenience for disposing the grooves, it is chosen to dispose the groove 10 at the arc surface 12 at 60° and 120° along the circumference direction of each permanent magnet 8. And the angle is formed by two lines connecting the two boundaries of two neighboring permanent magnets and intersecting at the center of the stator 30. Please refer to FIG. 24, which is a cross-sectional view illustrating the seventh embodiment regarding the rotary structure of a permanent magnet motor for the present application. The rotary structure 824 of the permanent magnet motor in FIG. 24 is based on the outer rotor permanent magnet motor illustrating in FIG. 20, and the relevant computing parameters are defined as follows: P=4, K=12, M=24, f=24 and $\beta_0$=180°. In accordance with step (q), calculating and choosing an angle, $\alpha_p$, along the circumference direction within an angular range for each angular range corresponding to the pair of the arc-cut surface 11 of the permanent magnets 8. In accordance with step (t): after calculating, the preferred angular positions for disposing the grooves 10 are at the electrical angles of 60° and 120° along the circumference direction of each permanent magnet 8, as shown in FIG. 24.

Figure 12:
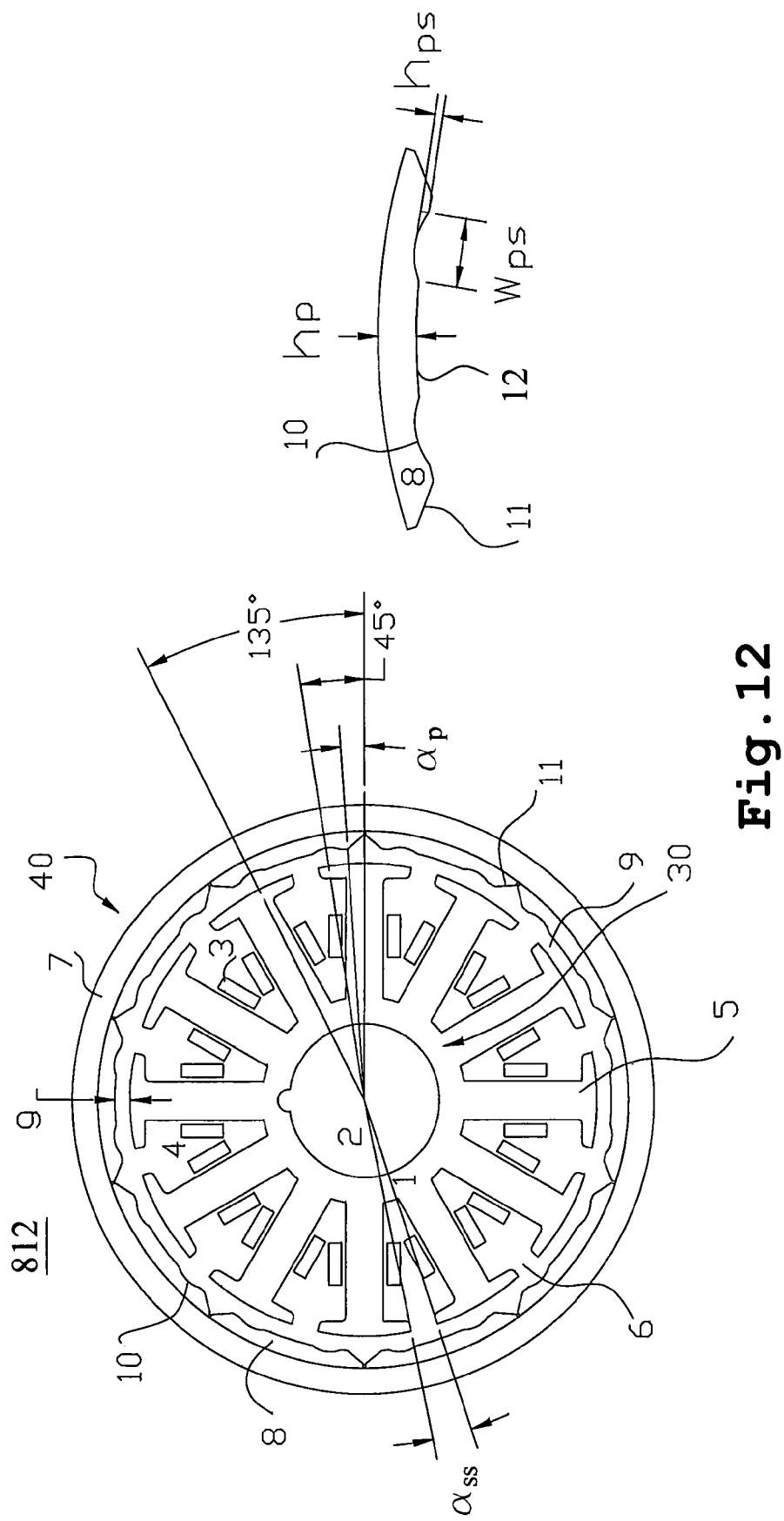
FIG. 12 is a cross-sectional view illustrating the embodiment regarding the rotary structure of a permanent magnet motor according to FIG. 25 of the present application.
Figure 25:
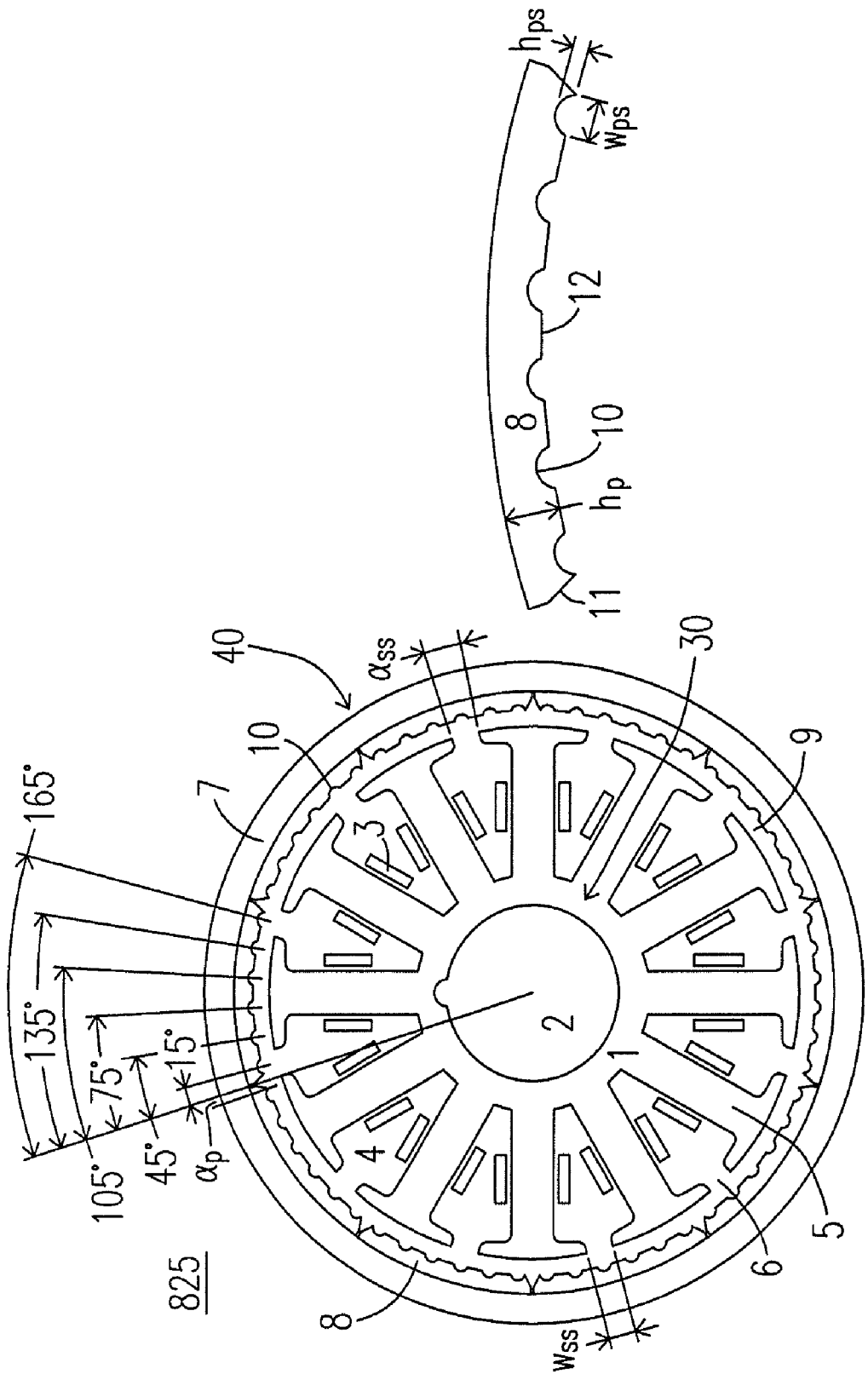
FIG. 25 is a cross-sectional view illustrating the eighth embodiment regarding the rotary structure of a permanent magnet motor for the present application.

Please refer to FIG. 25, which is a cross-sectional view illustrating the eighth embodiment regarding the rotary structure of a permanent magnet motor for the present application. The rotary structure 825 of the permanent magnet motor in FIG. 25 is based on the outer rotor permanent magnet motor illustrating in FIG. 7, and the relevant computing parameters are defined as follows: P=5, K=12, M=60, f=60 and $\beta_0$=0°. In accordance with step (q), calculating and choosing an angle, $\alpha_p$, along the circumference direction within an angular range for each angular range corresponding to the pair of the arc-cut surface 11 of the permanent magnets 8. In accordance with step (t): after calculating, the preferred angular positions for disposing the grooves 10 are at the electrical angles of 15°, 45°, 75°, 105°, 135° and 165° along the circumference direction of each permanent magnet 8, as shown in FIG. 25. Please refer to FIG. 12, which is a cross-sectional view illustrating the embodiment regarding the rotary structure of a permanent magnet motor according to FIG. 25 of the present application. The rotary structure 812 of the permanent magnet motor in FIG. 12 is based on the outer rotor permanent magnet motor illustrating in FIG. 5 but the structure for reducing the cogging torque is further incorporated thereinto. FIGS. 25, 5 and 12 share the same reference numerals for addressing the identical element. The parameters applied in this preferred embodiment are defined as follows: P=5, K=12, M=60 and f=60. In accordance with step (q), calculating the angle, $\alpha_p$, along the circumference direction within an angular range for each angular range corresponding to the pair of the arc-cut surfaces 11 of the permanent magnets 8. The angle is smaller than that in FIG. 10. The phase difference between the cogging torque wave with the arc-cut surfaces and the cogging torque wave without the arc-cut surfaces for not any groove 10 on the arc-cut surfaces 11 of permanent magnets 8 chosen in this preferred embodiment is required for the procedure determining the structure for reducing the cogging torque. The information regarding the phase difference, $\beta_0$, is included in FIG. 13. Since the angle $\alpha_p$ is different from that in FIG. 10, the phase difference $\beta_0$ is correspondingly varied.

Figure 13:
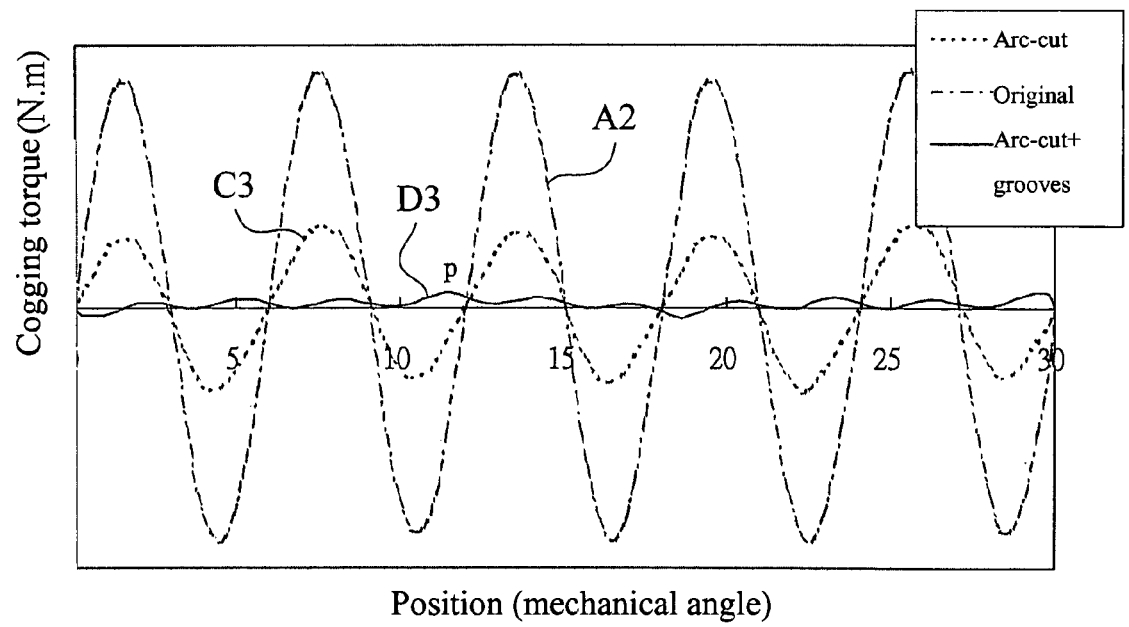
FIG. 13 is a diagram illustrating the variation of the cogging torque of a permanent magnet motor with respect to a mechanical angle corresponding to FIG. 2, FIG. 5 and FIG. 12.

Please refer to FIG. 13, which is a diagram illustrating the variation of the cogging torque of a permanent magnet motor with respect to a mechanical angle corresponding to FIG. 2, FIG. 5 and FIG. 12. All of the permanent magnet motor illustrating in FIG. 2, FIG. 5 and FIG. 12 are a permanent magnet motor with ten poles and twelve slots. However, in FIG. 13, waveform A2 is the cogging torque wave of a permanent magnet motor illustrating in FIG. 2. It is realized from waveform A2 that for three kinds of conditions in FIG. 2, the permanent magnetic motor bears the maximum cogging torque while not any grooves or arc-cut surfaces is on the permanent magnets 8. The waveform C3 is the cogging torque wave of a permanent magnet motor illustrating in FIG. 5. It is realized from waveform C3 that forming a pair of symmetrical arc-cut surfaces 11 at two sides of each permanent magnet 8 is able to efficiently reduce the cogging torque of the permanent magnets 8. The waveform D3 is the cogging torque wave of a permanent magnet motor illustrating in FIG. 12. It is realized from waveform D3 that forming a pair of symmetrical arc-cut surfaces 11 at two sides of each permanent magnet 8 and simultaneously disposing the grooves 10 at the proper locations on the arc surface 12 of the permanent magnets 8 is able to obtain a minimum of the cogging torque for the permanent magnet motor, and its wave-cyclic number of the cogging torque is twice of those of other three conditions. Besides, it is concluded through comparing wave A2 and wave C3 that the phase difference, $\beta_0$, between the cogging torque wave with arc-cut surfaces 11 and the cogging torque wave without arc-cut surfaces 11 when there is not any groove 10 disposed on the permanent magnets 8 is 0.

Figure 26:
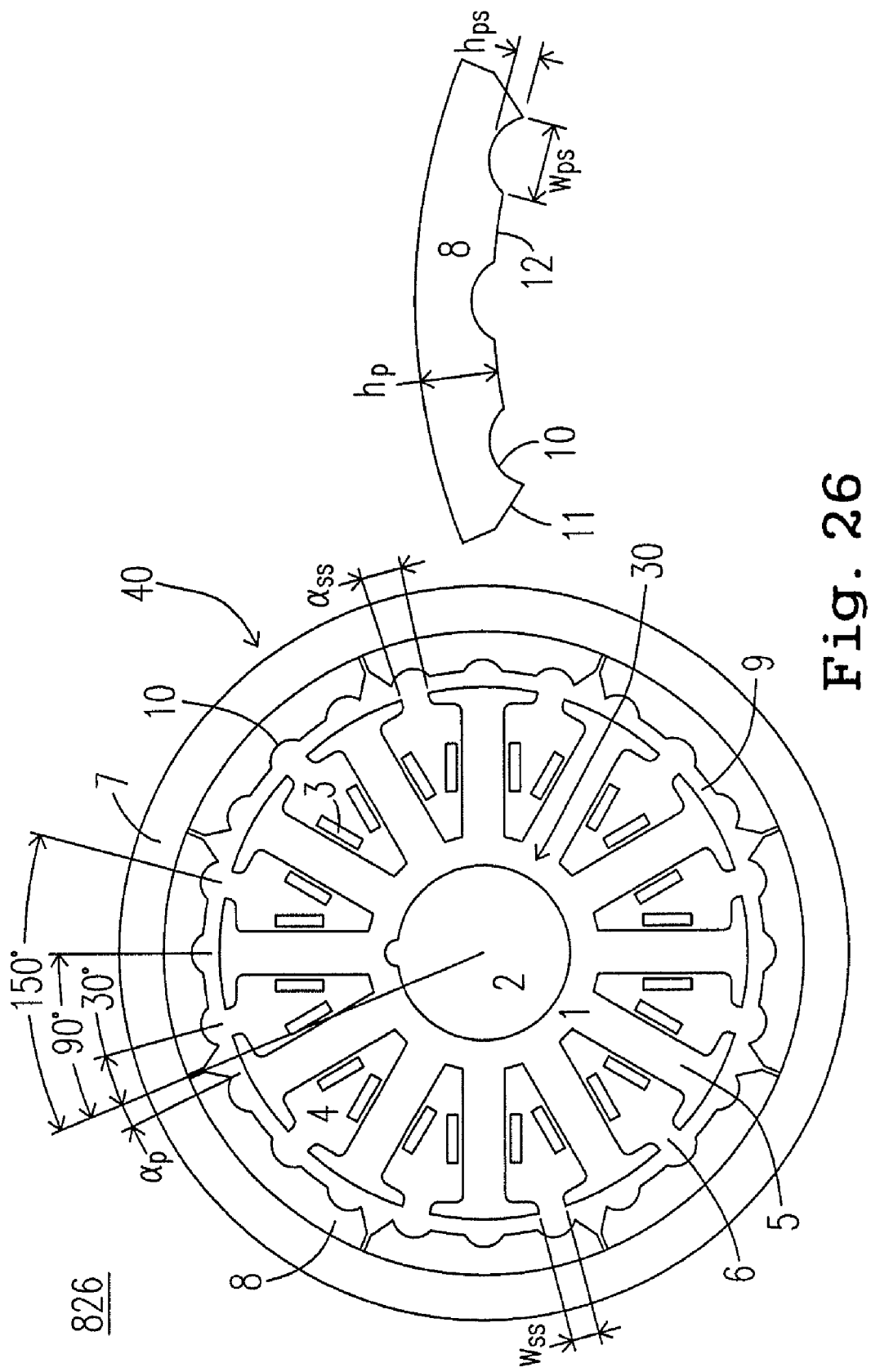
FIG. 26 is a cross-sectional view illustrating the ninth embodiment regarding the rotary structure of a permanent magnet motor for the present application.

Please further refer to FIG. 12, in accordance with step (t): after calculating the preferred angular positions for disposing the grooves 10 are at the electrical angles of 15°, 45°, 75°, 105°, 135° and 165°. After considering the symmetry and the convenience for disposing the grooves, it is chosen to dispose the grooves 10 on the arc surface 12 at 45° and 135° along the circumference direction of each permanent magnet 8. And the angle is formed by two lines connecting the two boundaries of two neighboring permanent magnets and intersecting at the center of the stator 30. Please refer to FIG. 26, which is a cross-sectional view illustrating the ninth embodiment regarding the rotary structure of a permanent magnet motor for the present application. The rotary structure 826 of the permanent magnet motor in FIG. 26 is based on the outer rotor permanent magnet motor illustrating in FIG. 20, and the relevant computing parameters are defined as follows: P=4, K=12, M=24, f=24 and $\beta_0$=0°. In accordance with step (q), calculating and choosing an angle, $\alpha_p$, along the circumference direction within an angular range for each angular range corresponding to the pair of the arc-cut surface 11 of the permanent magnets 8. In accordance with step (t): after calculating, the preferred angular positions for disposing the grooves 10 are at the electrical angles of 30°, 90° and 150° along the circumference direction of each permanent magnet 8, as shown in FIG. 26.

Subsequently, a preferred embodiment of the present invention is presented as follows to demonstrate the preceding principle when applying in the permanent magnet motor. The rotary structure of the permanent magnet motor introduced herein is based on the inner rotor permanent magnet motor with eight poles and six slots but the structure with symmetrical arc-surfaces disposed on each permanent magnet and the structure for reducing the cogging torque is further incorporated thereinto. In the present preferred embodiment, the relevant computing parameters are defined as follows: P=4, K=6, M=24 and f=24. In accordance with step (q), calculating and choosing an angle, $\alpha_p$, along the circumference direction within an angular range for each angular range corresponding to the pair of the arc-cut surfaces of the permanent magnets. The phase difference, $\beta_0$, between the cogging torque wave without the arc-cut surfaces and the cogging torque wave with the arc-cut surfaces while there is not any groove on the permanent magnets is required during the procedure for determining the structure and reducing the cogging torque. The phase difference, $\beta_0$, is 0°. In accordance with step (t): after calculating, the preferred angular positions for disposing the grooves are at the electrical angles of 30°, 90° and 150°. After considering the symmetry and the convenience for disposing the grooves, it is chosen to dispose the groove 10 on the arc surface 12 in every 90° along the circumference direction of each permanent magnet. And the angle is formed by two lines connecting the two boundaries of two neighboring permanent magnets and intersecting at the center of the stator 30.

Subsequently, the influences of the width $w_{ps}$ and the depth $h_{ps}$ of the groove 10 on the cogging torque are estimated as follows. In order to significantly demonstrate the influence of the width $w_{ps}$ on the cogging torque, a angle D=180 Mod(2P/K,1) is defined and a diagram illustrating the variation of the cogging torque peak values with respect to the ratio $w_{ps}$/D is demonstrated.

Figure 14:
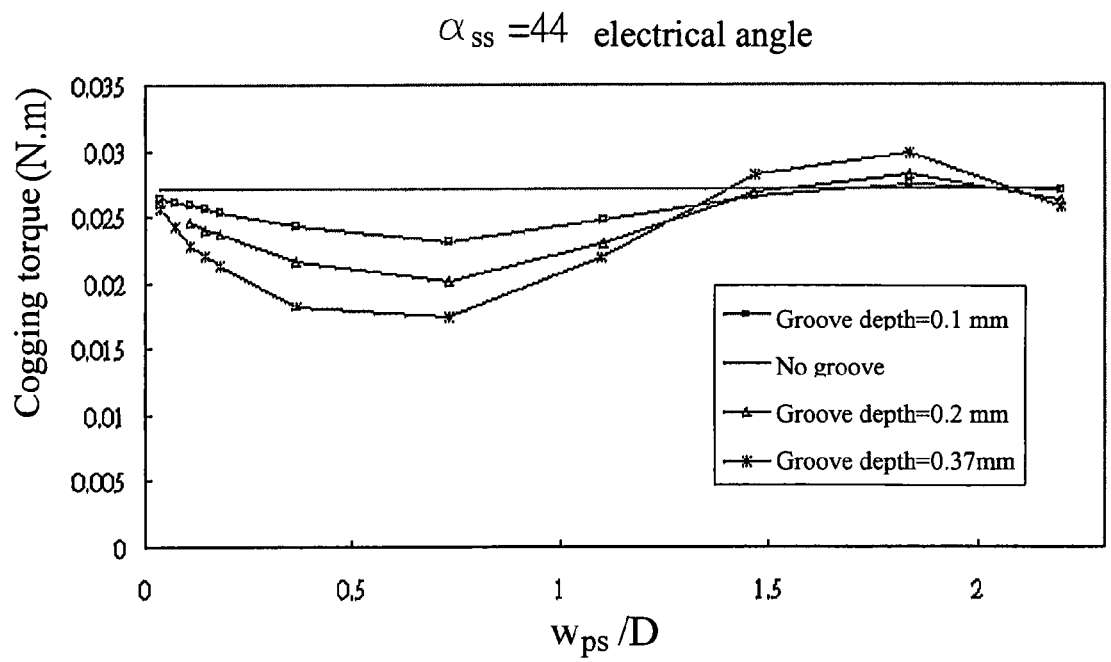
FIG. 14 is a diagram illustrating the first variation type of the cogging torque peak value with respect to the opening width.

Please refer to FIG. 14, which is a diagram illustrating the first variation type of the cogging torque peak value with respect to the opening width. In FIG. 14, the electrical angle, $\Delta_{ss}$, corresponding to the slot opening width $w_{ss}$ of the winding slot 6 of the stator 30 for an outer rotor permanent magnet motor is 44° degree. There are four curves shown in FIG. 14 and the respective curve is corresponding to the variation of the cogging torque peak value with respect to the ratio $w_{ps}$/D for different depth $h_{ps}$ of the grooves 10. As demonstrating in the figure, the cogging torque peak value is reduced in accordance with the increasing of width $w_p$, of the groove 10. When the width $w_{ps}$ of the groove 10 is equal to $w_{ps}$=0.73D, the cogging torque peak value is minimum. When the width $w_{ps}$ of the groove 10 is larger than 0.73D, the cogging torque peak value is increased in accordance with the increasing of the width $w_{ps}$ of the groove 10. When the width $w_{ps}$=1.5D, the cogging torque peak value becomes larger than the value for not any groove 10 is disposed. That is, the cogging torque is worsened by the disposing of the grooves 10. When the width $w_{ps}$ is increased to 2D, the cogging torque peak value is again smaller than that for not any groove 10 is disposed. It is inferred from the figure, when the width $w_{ps}$ is in a range of $0.2D \leq w_{ps} \leq 1.1D$ the reduction of the cogging torque is significant.

It is also inferred from FIG. 14, when the depth $h_{ps}$ is deepened, the cogging torque peak value becomes smaller, in particular to a range of $w_{ps}$<1.5D. Therefore, it is concluded that as depth of the groove is deeper relatively, the suppression thereof to the cogging torque becomes remarkable. However, if the depth $h_{ps}$ of the groove is exceedingly deep, the influence thereof to the counter electromotive force of the windings 3 becomes correspondingly remarkable. That is, the magnitude and the waveform of the counter electromotive force are influenced. Hence, the preceding factors must be comprehensively estimated and an optimized depth value for the depth $h_{ps}$ of the groove 10 is then determined accordingly.

Figure 15:
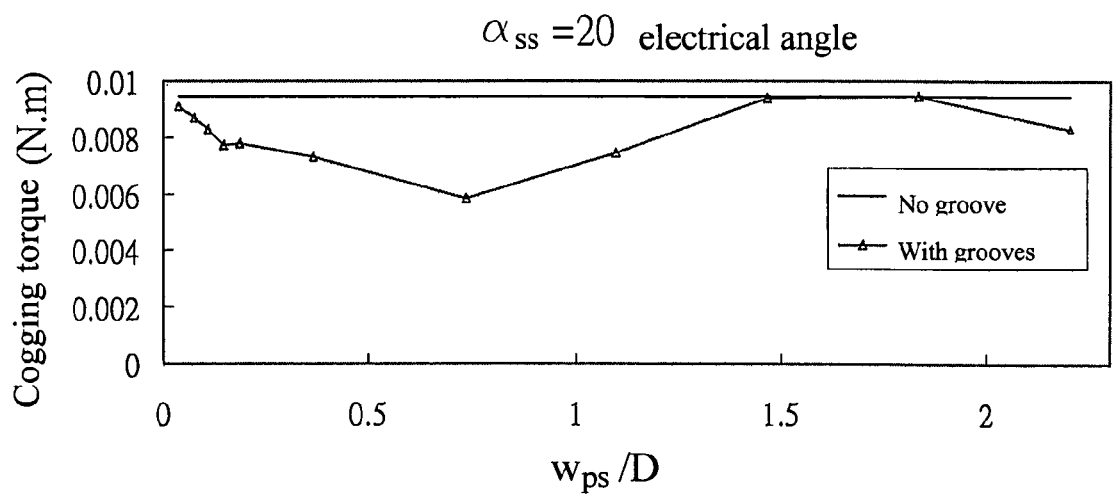
FIG. 15 is a diagram illustrating the second variation type of the cogging torque peak value with respect to the opening width.

Please refer to FIG. 15, which is a diagram illustrating the second variation type of the cogging torque peak value with respect to the opening width. In FIG. 15, the electrical angle, $\alpha_{ss}$, corresponding to the slot opening width $w_{ss}$ of the winding slot 6 of the stator 30 for an outer rotor permanent magnet motor is 20°. There are two curves shown in FIG. 15, and the respective curve is corresponding to the variation of the cogging torque peak values without groove and for the grooves disposed with respect to the ratio $w_{ps}$/D without any arc-cut surface 11 at two sides of each permanent magnet 8. The meaning of the curves shown in FIG. 15 is similar to that in FIG. 14, and thus it is not redundantly repeated herein.

Figure 16:
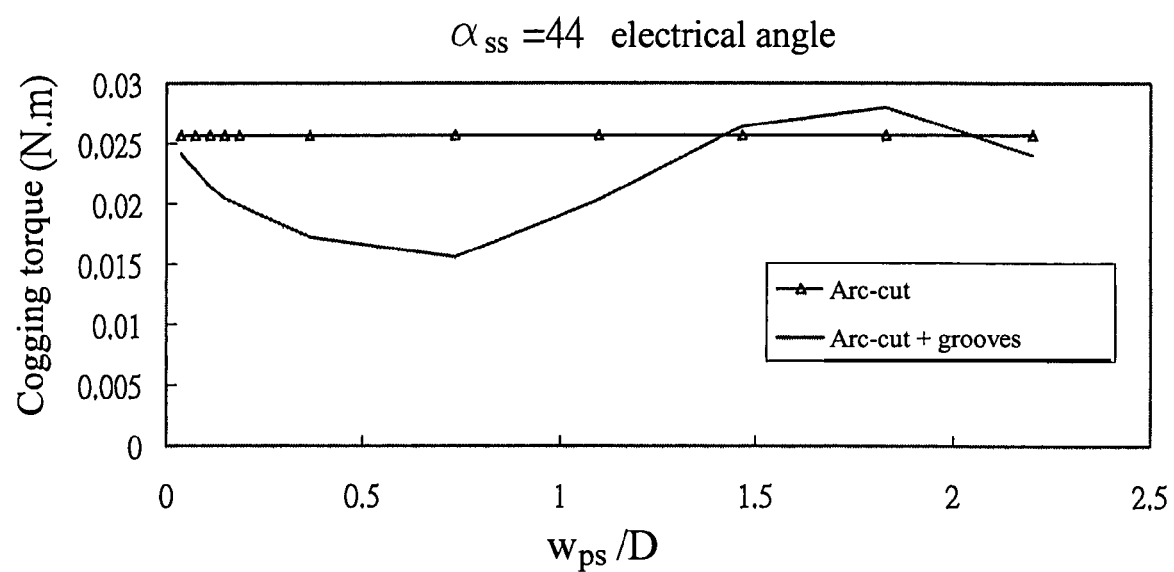
FIG. 16 is a diagram illustrating the third variation type of the cogging torque peak value with respect to the opening width.

Please refer to FIG. 16, which is a diagram illustrating the third variation type of the cogging torque peak value with respect to the opening width. In FIG. 16, the electrical angle, $\alpha_{ss}$, corresponding to the slot opening width $w_{ss}$ of the winding slot 6 of the stator 30 for an outer rotor permanent magnet motor is 44'. There are two curves shown in FIG. 16 and the respective curve is corresponding to the variation of the cogging torque peak value without groove and for the grooves disposed with respect to the ratio $w_{ps}$/D for the condition that a pair of symmetric arc-cut surfaces 11 is disposed at two sides of each permanent magnet 8. The meaning of the curves shown in FIG. 16 is similar to that in FIG. 14, and thus it is not redundantly repeated herein.

After comparing FIG. 14, FIG. 15 and FIG. 16, it is able to make a conclusion that as the electrical angle, $\alpha_{ss}$, corresponding to the slot opening width $w_{ss}$ of the winding slot 6 of the stator 30 is smaller, the cogging torque becomes correspondingly smaller.

Therefore, the technical features of the present application are repeated as follows. A rotary structure of a permanent magnet motor including a stator and a rotor, K salient teeth are formed on the surface of the stator and K winding slots are formed among the K salient teeth, and P pairs of permanent magnets are formed on the surface of the rotor. At least one groove is formed on the arc surface along the circumference direction of each permanent magnet so as to reduce the cogging torque. Each specific angular position for disposing the groove is chosen from n angular positions, 180 Mod((2P/K)i–P/f,1), in which i=1, 2, . . . , n, and the groove has a width of $w_{ps}$, $0.2D \leq w_{ps} \leq 1.1D$, in which n=M/(2P), M is a lowest common multiple of 2P and K, Mod( ) is a remainder operator, and f is a wave-cyclic number of the cogging torque per rotation in the absence of the groove. When a pair of symmetric arc-cut surfaces are formed at two sides of each permanent magnet, each specific angular position for disposing the groove is chosen from n angular positions: 180×Mod((2P/K)i–P/f+$\beta_0$P/(180f),1), where i=1, 2, . . . , n, and $\beta_0$ is the phase difference between the cogging torque wave without the arc-cut surfaces and the cogging torque wave with the arc-cut surfaces.

To sum up the aforementioned, the rotary structure for the permanent magnet motor and the method reducing the cogging torque presented by the present application indeed achieve the anticipated effect. Hence, the present invention not only bears a novelty and a progressive nature, but also bears a utility. While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims that are to be accorded with the broadest interpretation, so as to encompass all such modifications and similar structures. According, the invention is not limited by the disclosure, but instead its scope is to be determined entirely by reference to the following claims.

What is claimed is:

1. A permanent magnet motor, comprising:
   a stator, comprising:
      a stator shaft having an outer surface;
      K salient teeth formed upon the outer surface; and
      K winding slots formed among the K salient teeth; and
   a rotor, comprising:
      a first inner surface facing the outer surface; and
      P pairs of permanent magnets formed on the first inner surface, each of which has a second inner surface facing the outer surface, two boundaries and at least a groove formed on the second inner surface between the two boundaries, the groove causing a reduction in cogging torque,
   wherein K is a natural number larger than 1 and K≦54, P is a natural number and P≦100, the groove on the second inner surface has a specific angular position chosen from n electrical angular positions, 180 Mod((2P/K)i–P/f,1) degrees, wherein i=1, 2, . . . , n, and the groove has a width of $w_{ps}$, $0.2D \leq w_{ps} \leq 1.1D$ degrees, n=M/(2P), M is a lowest common multiple of 2P and K, Mod( ) is a remainder operator, f is a wave-cyclic number of the cogging torque per rotation in the absence of the groove, and D=180 Mod(2P/K,1) degrees; and wherein the groove further comprises an optimized depth value being a highest one of depth values satisfying a condition that a predetermined structural strength of the motor is maintained, and a waveform and a value of a counter electromotive force of the motor are both kept unchanged so as to reduce the cogging torque.

2. A permanent magnet motor according to claim 1, wherein the stator further comprises a stator core fixed to the stator shaft, and the K salient teeth are extended from the stator core and are uniformly distributed along the outer surface and symmetric to the stator shaft.

3. A permanent magnet motor according to claim 1, wherein the rotor further comprises a rotor yoke, and the P pairs of permanent magnets are fixed to the rotor yoke and are uniformly distributed along the first inner surface and symmetric to the stator shaft.

4. A permanent magnet motor according to claim 1, wherein the groove is in an arc cross section.

5. A permanent magnet motor according to claim 1, wherein the groove is in a polygonal cross section.

6. A permanent magnet motor, comprising:
a stator, comprising:
a stator shaft having an outer surface;
K salient teeth formed upon the outer surface; and
K winding slots formed among the K salient teeth; and
a rotor, comprising:
a first inner surface facing the outer surface; and
P pairs of permanent magnets formed on the first inner surface, each of which has a second inner surface facing the outer surface, two boundaries and at least a groove formed on the second inner surface between the two boundaries, the groove causing a reduction in togging torque,
wherein K is a natural number larger than 1 and K≦54, P is a natural number and P≦100, the groove on the second inner surface has a specific angular position chosen from n electrical angular positions, 180 Mod((2P/K)i−P/f,1) degrees, wherein i=1, 2, . . . , n, and the groove has a width of wps, 0.2D≦wps≦1.1D degrees, f is a wave-cyclic number of the cogging torque per rotation in the absence of the groove, and D=180 Mod(2P/K,1) degrees; and
wherein each of the P pairs of permanent magnets further comprises a pair of symmetric arc-cut surfaces formed at two sides of each permanent magnet, and an arc-cut surface occupies a peripheral electrical angle $\alpha_p$, on the second inner surface, chosen within a range of: $\alpha_{min}-0.8\alpha_{ss} \leq \alpha_p \leq \alpha_{min}+0.8\alpha_{ss}$, wherein $\alpha_{min}$=180×min(Mod((2P/K)i,1), i=1, 2, . . . , n−1) degrees, $\alpha_{ss}$ is an electrical angle corresponding to a slot opening width $w_{ss}$ of one of the K winding slots, n=M/(2P), M is a lowest common multiple of 2P and K, Mod( ) is a remainder operator, and min( ) is a minimum value operator.

7. A permanent magnet motor according to claim 6, wherein a groove on the second inner surface has a specific angular position chosen from n electrical angular positions: 180×Mod((2P/K)i−P/f+$\beta_0$P/(180f),1) degrees, where i=1, 2, . . . , n, and $\beta_0$ is the phase difference between the cogging torque wave without the arc-cut surfaces and the cogging torque wave with the arc-cut surfaces.

8. A permanent magnet motor according to claim 6, wherein the arc-cut surfaces are symmetric to each other along a radial direction of the stator shaft, and an air gap is formed among the K salient teeth, the K winding slots and the P pairs of permanent magnets.

9. A permanent magnet motor according to claim 1, wherein the permanent magnet motor is a rotary electric machine, and the rotor rotates around the stator.

10. A permanent magnet motor, comprising:
a stator, comprising:
an inner surface;
K salient teeth formed on the inner surface; and
K winding slots formed among the K salient teeth; and
a rotor, comprising:
a rotor shaft having a first outer surface facing the inner surface; and
P pairs of permanent magnets formed upon the first outer surface, each of which has a second outer surface facing the inner surface, two boundaries and at least a groove formed on the second outer surface between the two boundaries, the groove causing a reduction in cogging torque,
wherein K is a natural number larger than 1 and K≦54, P is a natural number and P≦100, the groove on the second outer surface has a specific angular position chosen from n electrical angular positions, 180 Mod((2P/K)i−P/f,1) degrees, wherein i=1, 2, . . . , n, and the groove has a width of wps, 0.2D≦wps≦1.1D degrees, n=M/(2P), M is a lowest common multiple of 2P and K, Mod( ) is a remainder operator, f is a wave-cyclic number of the cogging torque per rotation in the absence of the groove, and D=180 Mod(2P/K,1) degrees; and
wherein the groove further comprises an optimized depth value being a highest one of depth values satisfying a condition that a predetermined structural strength of the motor is maintained, and a waveform and a value of a counter electromotive force of the motor are both kept unchanged so as to reduce the cogging torque.

11. A permanent magnet motor according to claim 10, wherein the stator further comprises a stator yoke, and the K salient teeth are extended from the stator yoke.

12. A permanent magnet motor according to claim 10, wherein the rotor further comprises a rotor core fixed to the rotor shaft, and the P pairs of permanent magnets are symmetric to the rotor shaft and formed on the rotor core.

13. A permanent magnet motor according to claim 10, wherein each of the P pairs of permanent magnets further comprises a pair of symmetric arc-cut surfaces formed at two sides of each permanent magnet, and the arc-cut surfaces are symmetric to each other along a radial direction of the rotor shaft.

14. A permanent magnet motor according to claim 10, wherein permanent magnet motor is a rotary electric machine, and the rotor rotates with the rotor shaft.

* * * * *